US011904597B2

(12) United States Patent
Cheng

(10) Patent No.: US 11,904,597 B2
(45) Date of Patent: *Feb. 20, 2024

(54) PRINTING PADS AND PRINT PAD MACHINES

(71) Applicant: Printex Inc., Poway, CA (US)

(72) Inventor: James Cheng, San Diego, CA (US)

(73) Assignee: PRINTEX INC., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,452

(22) Filed: May 31, 2023

(65) Prior Publication Data

US 2023/0302783 A1 Sep. 28, 2023

Related U.S. Application Data

(60) Continuation of application No. 17/933,505, filed on Sep. 20, 2022, now Pat. No. 11,701,877, which is a division of application No. 16/878,174, filed on May 19, 2020, now Pat. No. 11,485,130.

(51) Int. Cl.
*B41F 17/00* (2006.01)
*B41M 1/40* (2006.01)

(52) U.S. Cl.
CPC ............ *B41F 17/001* (2013.01); *B41M 1/40* (2013.01)

(58) Field of Classification Search
CPC .... B41F 17/001; B41F 17/002; B41F 17/006; B41F 17/08; B41F 17/10; B41F 17/18; B41F 17/20; B41F 17/22; B41F 17/26; B41F 17/28; B41F 17/30; B41F 17/36; B41M 1/40
See application file for complete search history.

(56) References Cited

U.S. PATENT DOCUMENTS

| | | | |
|---|---|---|---|
| 5,537,921 | A | 7/1996 | Adner et al. |
| 6,931,988 | B1 | 8/2005 | Sherf |
| 7,498,277 | B2 | 3/2009 | Pace et al. |
| 10,549,521 | B2 | 2/2020 | Adner et al. |

OTHER PUBLICATIONS https://www.decotechgroup.com/library/pad-printing/tech-bulletin-pad-usage/; DECO TECHnology Group "How to Select the Proper Pad for the Job" (2002) 5 pages.

*Primary Examiner* — Christopher E Mahoney
*Assistant Examiner* — Marissa Ferguson-Samreth
(74) *Attorney, Agent, or Firm* — Roach Brown McCarthy & Gruber, P.C.; Kevin D. McCarthy

(57) ABSTRACT

A printing pad machine that can print a 360 degree image on a cylindrical object. That objective is achieved by modifying a conventional printing pad machine. The modifications include using a single angled print pad having a contact wall having a first height, a lower wall having a second height that is less than the first height, an angled surface interconnecting the contact wall's distal end and the lower wall's distal end, and a base wall interconnecting the contact wall's proximal end and the lower wall's proximal end and connectable to a base. Another modification includes a flexion-extension hinge positioned between the support member and the base or the support member and the overhead gantry and controlled by the adjustable and moveable actuator system and power source. That objective can be accomplished with the conventional printing pad machine using the single angled print pad.

15 Claims, 21 Drawing Sheets

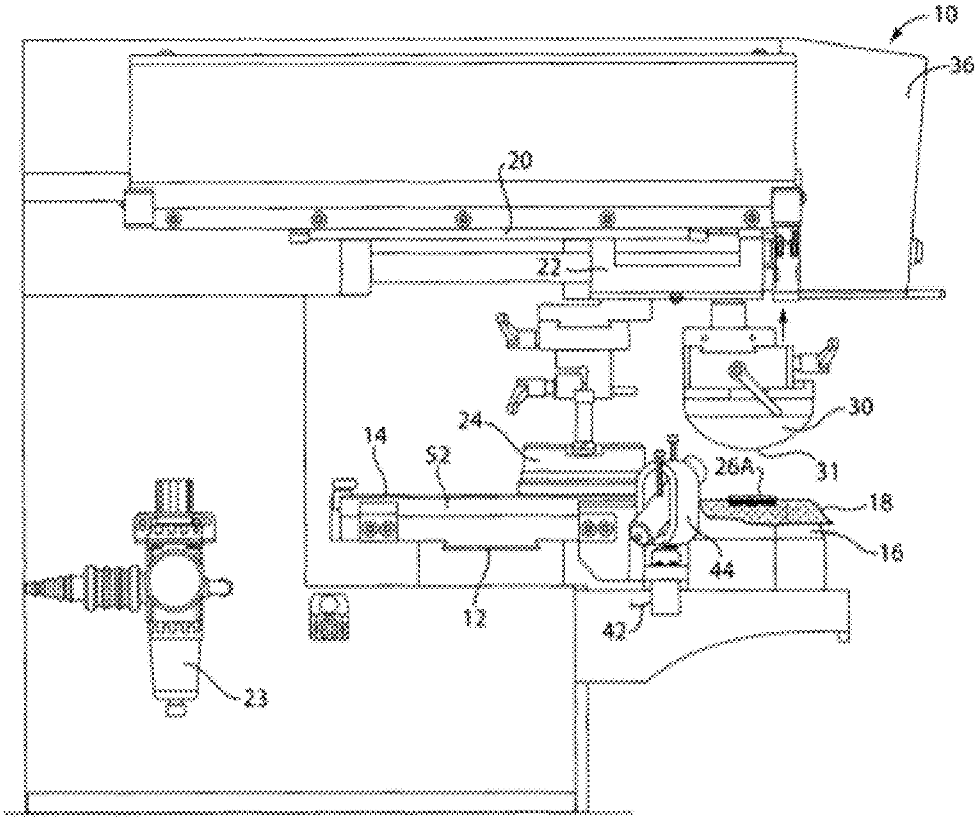
Fig. 9 (Prior Art)
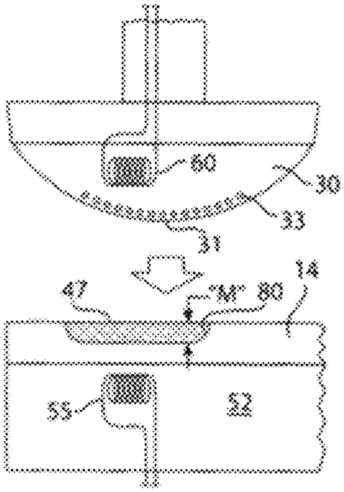
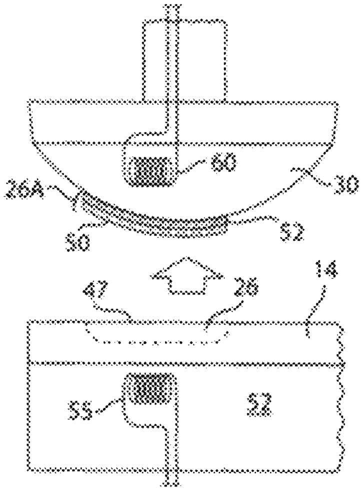
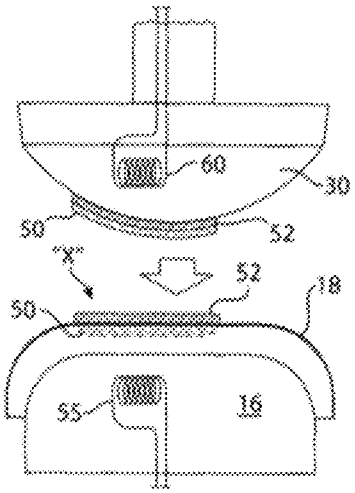
Fig. 10A (Prior Art) Fig. 10B (Prior Art) Fig. 10C (Prior Art)

PRINTING PADS AND PRINT PAD MACHINES

FIELD OF THE INVENTION

This invention is directed to print pad machines and corresponding printing pads.

BACKGROUND OF THE INVENTION

About Printing Pads

At https://www.decotechgroup.com/library/pad-printing/tech-bulletin-pad-usage/; DECO TECHnology Group asserts it wrote in 2002 the following: "How to Select the Proper Pad for the Job . . . Pad printing is a gravure (offset) printing process that takes a certain amount of operator skills to properly print a given job . . . . One of the most frequently asked questions in the early stages of learning the do's and don'ts of the pad printing process is, 'How do I know what pad to use for this part?' Literally there are hundreds of sizes and shapes of pads out there to choose from—and then add the next most important variable of determining which hardness of rubber to use—and the level of confusion is only compounded further . . . .

QUESTION: 'How do I know what pad to use for this (fill in the blank) part?'

ANSWER: 'Select a print pad that is large enough to compress by hand over the product to be printed.

Watch it roll outward and down onto the part, completely covering the printable area. Usually such a pad will suit your needs.'

This statement of course assumes that you have a suitable pad in your supply cabinet from which you can make this hand test. If you don't, let's dig further into this subject and . . . explain the basic details you need to find the right pad.

The truth is that there is not just one pad that will properly print your part, but several pads that will print your job. Thus it is important to have a good cross section inventory of pads to choose from—when faced with selecting a new pad for a new . . . .

The key to your printing success is to eliminate as many variables as possible and this article is meant to address just one of the key variables in the pad printing process. Using a bit of basic common sense and simple scientific principles, we can properly explain what variables are attributed to the silicone transfer pad. There is much more to "it" than just transferring the image from the cliché onto the part . . .

There are six factors that come into play when selecting the proper pad for the job:

1. Shape of the pad
2. Size of the pad (in relationship to the size of the printed image)
3. Height of the pad
4. Durometer (hardness) of the pad
5. Surface finish of the pad
6. Material(s) of the pad The Shape and Size of the pad are the two most important variables in selecting the right pad.

1. Shape of the Pad In pad printing there are only a few shapes that are considered "standard" shapes. [There are] five style categories—and four of which are considered "standard" shapes:

Square or rectangular pads
Round pads
Loaf (like a loaf of bread) pads
"V" shaped or bar pads
Custom (specially designed pads for specific applications).

The pad must roll . . . In order to attain an acceptable quality print, the pad surface must compress and roll outward onto the cliché and it must cover the entire etched image area without distorting the image when the ink transfer is printed onto the part. The shape of the pad has a major role in determining how well the pad performs the rolling out action.

It is best to use a pad that has a high angle of attack (see, FIG. 1A) and you should avoid using flat-surfaced (or low-profile) pads (see, FIG. 1B) whenever possible, as they will trap air when they compress against the cliché, and the ink will not be lifted out of the cliché but rather it will "smush" outward and create a poor quality print. By having a high angled pad, the greater outward rolling action that is achieved, will yield a better quality print every time.

The square and round shaped pads are considered the most popular pads on the market and these two shapes can often times be interchanged and print the same products. As a general rule, round shaped pads . . . provide concentric compression that is not distorted in one direction or the other. A square shaped pad also has these same concentric compression characteristics, and sometimes a square shaped pad (with near 90 degree side walls) is all that will fit into the dimensions of a particular pad-printing machine. This is especially true in small compact sized printers.

A loaf shaped pad is a modified rectangle pad that is designed to allow for linear type or straight-lined graphics. [The loaf shaped pad has a top surface having a salinon or near-salinon geometrical figure defined by four semi-circles extending from walls that support the top surface and arcuate surfaces.] A classic use of a loaf pad is pad printing on pen barrels [a.k.a., curvilinear surfaces]. (Bracketed material added for clarification.)

A V shaped pad is a pad that is a long bar like pad that is typically molded to have a sharp V shaped bevel. With most V shaped pads you want to print on one side or the other side of the apex of the pad. With V shaped pads you can get double the life from that pad by using both sides of the pad. When the first side of the pad wears out, simply turn it around and use the opposite side for printing the same graphic . . . . A special pad is typically a hybrid design and it may encompass any one or more of the other four basic shapes in its design. One classic example is creating a pad that has two round shapes molded in a side-by-side manner. That way there is no need for any special set up when printing the particular project. Another example of a custom pad is one to print onto a control knob. The custom pad has a machined recess or hole in it to accommodate the raised portion of the knob.

2. Size of the Pad As stated above, the shape of the pad plays a large role in determining how well the pad will achieve this rolling out action. In determining the size of the pad for the product [some preach], "When it comes to pad selection, BIGGER IS BETTER". However more times than not, your printing machines dimensions and pad compression (force) will determine the size pad you can use. The bigger the pad, the less the image is likely to distort. For the best possible results, use the largest pad possible that your cliché size and machine size will allow.

Even though . . . a large sized pad [is recommended], [it is also recommended that] the minimum amount of pad stroke pressure to pick up and print the image. By using a small amount of force you create less wear on the pad and you have less chance of distorting the image by "over-driving" the pad. An easy way to determine how little force is enough. When you are printing the image satisfactorily simply back off on the pad force until you stop printing the entire image and then work your way back up in pad force so that you are making a full transfer every cycle.

3. Durometer or Hardness of the Pad. The hardness of the pad is determined by the content of silicone oil that is used in the pad formulation. The rule goes like this, the harder the pad, the less silicone oil that was added to the formulation. The most popular hardness's tend to be in the 40 to 55-shore range . . . , but there are applications that use harder rubber and there are applications that use softer durometer . . . .

As a general rule, the harder the pad, the better the performance. However, a hard pad may prove to be impractical for certain applications, such as when using a low-power (pad compression) machine or when printing on a fragile object, such as when pad printing onto a glass Christmas ornament.

4. Surface finish of the Pad In the industry the common practice for pad manufacturers is to provide silicone pads with a high gloss surface finish. Before these pads can be run effectively they usually have to be "broken in"- or have the excess silicone oil (which creates that glossy appearance) removed to allow for good pick up and ink transfer during the printing process. Typically, a strong solvent is used, such as a fast speed thinner (accelerator) for initially removing that excess silicone-oil. But if you use too much of this solvent, you can damage the pad and shorten its life expectancy. The need to "break in" a pad prior to use is more prevalent on softer pads, because they contain more silicone oil.

After you have broken in the pad and removed the excess oil, the next step should be to gently wipe the pad with an alcohol-based pad-cleaning fluid before going into production. This removes any free silicone oil that can sometimes leach out of the pad. Once you begin production the best cleaning method (to remove solid debris, dried ink, and dust) is to use a quality "shipping tape" and the adhesive surface of the tape to lift off any contamination.

By following these simple steps, you will improve your print quality, reduce downtime, and prolong the life of the pad.

Many pad suppliers offer a "pad rejuvenator". A pad rejuvenator is a silicone oil based material that is designed to penetrate the surface of the pad and extend the life of the printing pad. This is usually a spray that can be applied to the pad surface when it becomes dry due to the loss of silicone oils during production. The oils are pulled from the pad by aggressive thinners. While a pad rejuvenator can indeed help to prolong the life of a pad, it is important to not spray this oil anywhere near a surface that has to be decorated . . . .

5. Material of the Pad & Base In this section . . . both the silicone pad itself and the mounting bases [are discussed].

Regarding the pad itself, virtually all pads today are made of silicone rubber . . . . In the past, the first printing pads were made of gelatin and in these early days there was a limited range of pad shapes available due to the poor mechanical properties of gelatin, and these pads were designed much flatter than modern day silicone pads, because of gelatins lack of elasticity.

[Bases can be] both wood and aluminum bases—and ALL . . . bases are mounted accurately and all wooden bases can be equipped with either a standard SAE (Society of Automotive Engineers) ⅜" . . . 16 threaded insert (US standard) or with a metric insert 6×0.1 mm course thread. All . . . pads with wooden bases are supplied with pre-drilled holes in the bases for attaching to the pad holder of the machine.

[The] operator [should not] use wood screws to mount the pad to his pad holder, as this old-school method makes it very difficult to get repeatable pad positioning and it results in lengthy set-up times. Furthermore if you use wood screws to mount your pads, after you have taken the screws in and out several times, the wood is quickly stripped out and will no longer firmly hold the pad to the mounting bracket . . . . [A]luminum bases are also pre-drilled with a tapped and threaded hole. Usually with a 10-32 tapped hole. Similarly, if a setup requires multiple pads (such as found on a keyboard matrix), aluminum bases are preferable because they will make pad positioning easier and more repeatable . . . .

Use these guidelines when selecting the proper pad shape for a particular job:

First, select a print pad that is sized large enough to compress by hand over the product to be printed. As you are squeezing it down, watch it roll outward and down onto the part, completely covering the printable area. Usually such a pad will suit your needs. Do this with a few pads that you can later mount onto the pad printing press.

Next, try printing with each of the pads that you have hand selected. A little trial and error is the best method and actually printing with the pad(s) is most often the only way to really determine if that pad is going to deliver the required results. When sample printing, make sure that you are accurately transferring the artwork onto the part without distortion or pinholes.

If the pad shape you have chosen prints only part of the image area properly, look for similar shaped pad that is larger in the direction that the image is not printing. Having a distorted image around edges is almost always a sign of having a pad that is too small for the job.

Don't be afraid to try pads that might seem too large or have too steep of an angle—strange things can happen and remember the #1 rule . . . BIGGER IS BETTER. An unusual shaped pad just might solve your printing problem.

Poor quality or irregular ink pickup during the test printing usually means that air is trapped between the pad and the cliché—not enough rolling action! To prove this theory watch carefully as the pad is being compressed onto the cliché to pick up the image—be certain that you see a good rolling out action from that pad. No rolling=no quality printing.

Whenever it's possible, try to set up the pad so that the apex (the point) of the pad does not come into contact with the image area on the cliché. Air tends to get trapped at the apex and the ink deposit is not always consistent at the contact point.

Distortion will occur if the pad is "overdriven" because it is really too small for the image to be printed or if the transferred image is too close to the edges of the pad. Remember to ALWAYS USE AS LITTLE PAD FORCE AS POSSIBLE, both on ink pick up and on ink transfer.

Use these guidelines for pad hardness when selecting your pads:

Hard pads are most suitable for heavy textured surfaces you can also use them when you need to print an image in a recessed area next to a raised surface and a hard pad will roll over this "step".

You can also use hard pads in a pad adapter or matrix, when you must fit a single machine with numerous pads that are spaced with small gaps between them (for example, when printing computer keyboards or calculator keys).

Use softer pads when printing onto heavily contoured surfaces and when printing on fragile items.

You must use a softer pad if the power of your machine can't compress the pad sufficiently to achieve a satisfactory rolling action—or use a dual durometer pad.

Avoid using pads of radically different hardness's for the same part/application, or else the thickness of the ink deposit may vary. This is particularly true when dealing with a pad matrix.

Special pad designs for printing large images; in some applications a large graphic image must be printed and your machine does not have the power to compress such a large pad in a smooth motion. Three solutions to this problem are available; 1) Use a pad with a hollow interior that provides the same surface hardness. This hollow area will allow the machine to compress this pad further because there is no extra silicone material to provide resistance. This molding technique also reduces the cost of silicone rubber for such a large pad. 2.) Use what is called a "dual-durometer" pad. A dual-durometer pad is one where the core of the pad is made of a softer durometer material (easier to compress) and the outer layer is of a harder rubber (yielding quality printing results). Both of these methods can help, but the second produces a more stable pad. 3.) Use a pad of the same shape but of a taller design. This taller shape will allow for more compression with less machine force. And yet a fourth option is to look at a different printing method altogether such as screen-printing. Remember, pad printing was not originally designed for printing very large images—it was first developed for printing the fine graphic details found on Swiss watch dials . . . ."

Generic Description of Machines for Pad Printing

At U.S. Pat. No. 10,549,521; Adner et al. discloses, "Pad transfer printing technology has been in use for many years and is a common form of printing utilized in the decoration and branding of flat and more importantly, three dimensional products. A basic patent which represents the state-of-the-art may be seen in U.S. Pat. No. 7,498,277 B2. The pad transfer printing process uses a combination of components that allow the transfer of an image from an engraved print plate (cliché) to the surface requiring decoration. These components: print plate, print pad and inks, work together in an evaporative process which allows the ink to transfer from the plate, to the print pad and finally from the print pad to the surface requiring decoration . . . . Pad printing inks are a mixture of resins or binders (lacking colorant), pigments (containing colorants) and solvents (lacking colorants) that comprise the ink formulation. Current art limits the maximum workable image etch depth to be in the 0.0015-0.0018 range. Depths of image etches greater than these will not support pick up and transfer of the ink by the prior art systems . . . . Referring now to the drawings in detail and particularly to FIG. [2], there is shown the [prior printing process] which comprises a print pad machine 10 for the controlled seriatim transfer of a developing-arrangement of multi-layered ink initially drawn from a proportionately deep well ink cliché or etched image in an image print plate and then onto a printable item. The print pad machine 10 includes an elongated frame and support assembly 12 for securement and as-needed replacement of an etched ink-containing image-displaying print plate 14 thereon. The elongated frame support assembly 12 includes a print fixture 16 for fixedly supporting a preferably ink absorbing printable item 18 thereon. Such printable item 18 may be any absorbable curvilinear or linear item such as a piece of cloth or fabric as for example, an item of clothing such as a T-shirt, underwear, pants or hat, an insole or upper of a footwear member, or a sheet of material for advertising purposes or the like . . . . The frame and support assembly 12 also includes an overhead gantry 20, best represented in FIGS. [3-9], is utilized for slideably moving a support housing 22 back and forth between the image print plate 14 and the print fixture 16. The gantry 20 supports the pneumatically empowered longitudinal sliding of the support housing 22, through an air regulator connector arrangement 23, thereby facilitating the lateral displacement of an ink supply cup 24 back and forth, as represented by an arrow B in FIG. [3], over the cliché or etched image inkwell 26 (ink reservoir, which may be held above or below ambient temperature in a further embodiments) in the image print plate 14, as represented by the word "image" shown in FIG. [2]. The support housing 22 also supports the corresponding back and forth lateral displacement of a print pad 30 between the image (inkwell) 26 on the image print plate 14 and a printable item 18 supported on the print fixture 16, as represented in FIGS. [3] and [4]. The print pad 30 has a resilient, somewhat flexible, convex, downwardly-facing, curvilinearly shaped pick-up/ink deposition surface 31, as may be seen in FIGS. [4] and [6]. The support housing 22 also permits and supports the controlled up-and-down movement of the print pad 30 over the etched ink-filled image 26 and onto the image print plate 14 as represented in FIGS. [5] and [6], and subsequently, the up-and-down movement, as represented by arrow "D" in FIG. [8], and pressurized application of the print pad 30 against a printable item 18 supported on the print fixture 16 to apply a particular image 26A thereon, as represented in FIGS. [7, 8, 9 and 10C]. In a further embodiment of the print pad 30 itself, which includes the convex ink receiving portion 31 being formed of a thermochromic silicon material which changes color according to the temperature of the print pad 30. For example, that convex ink receiving portion 31 of the print pad 30 may turn from a dark blue color to a beige color to visually indicate that the desired temperature of the ink bearing surface has been reached. The frame support assembly 12 also includes an enclosure 36 for a proper system control computer 38 for operable control of the support housing 22 and its associated mechanisms of the print pad machine 10 by a machine operator (not shown), typically operating at a first end of the print pad machine 10, represented primarily in FIGS. [2 and 3]. The frame support assembly 12 includes temperature (heating or chilling) control modules 39 and pad position sensors 40 connected through a proper circuit 42 to the system control computer within the first end of the print pad machine, as shown in FIG. [3]. In a first preferred embodiment, an articulable print-pad-following heat sensor 44 is arranged on the frame support assembly 22 adjacent the print fixture 16 at the first end of the print pad machine 10, as represented in FIGS. [3-9]. The articulable temperature (heat or chill) sensor 44 is connected through the proper circuit 42 to the system control computer 38 and the heat control module 39, as represented in FIGS. [2 and 3], for continuously monitoring and controlling the heat of the print pad 30 as it traverses the print pad machine 10 from ink image pickup, represented in FIG. [5], to ink image deposition on the printable item, as represented in FIG. [8]. In a second preferred embodiment, the print pad 30 has a uniform array of temperature sensors 33 within the surface 31 of the print pad 30, to monitor and assist in the control and regulation of an array of heating elements 60 within the print pad 30, as represented in FIGS.

[10A-10C]. Such temperature sensors 44 or 33 would be properly connected to the system control computer 38 which regulates the temperature of the heating elements 60 within the print pad 30. Heating of the print pad 30 to required temperatures, for example, to a range of about 200 to about 350 degrees F. preferably about 230 to about 270 degrees F. depending upon the of the type of ink 47 being utilized effects the driving off of volatiles within the depth of attached ink not in direct contact with the surface 31 of the print pad 30, creating a "wetted" or second layer 50, as represented in FIG. [10B], and a more dense and more opaque, peripherally contiguous first layer 52, sandwiched between the surface of the print pad 30 again as represented in FIGS. [10B and 10C]. When the resilient curvilinear print pad 30 is pressed against a printable item 18, the (now outer) wetted layer 50, free of certain driven-off solvents is absorbed into the printable item 18, leaving the attached contiguous (inner) first layer 52 exposed on top thereof, as a now highly visible display on the surface of the printed item 18, not in it, which dual layer with different ink consistency configuration is represented in the right hand portion "X" of FIG. 9C. The print plate or cliché represented in FIG. [10A], contains the etched inkwell 80, shown as member 26 in a perspective view in FIG. [2], and more definitively in FIG. [10A], which etched inkwell 80 forms the image 26 to be transferred by a corresponding ink now pad-attached pattern 26A, transferable to the printed item 18. The preferred depth "M" of the etched inkwell image in the print plate 14 is critically depth-enhanced to between about 0.0015 to 0.0035 inches, as represented diagrammatically in FIG. [10A]. The etched inkwell 80 bearing the image to be transferred contains the ink 47, such as for example: Inkcups Now Corp. ink identified as SB Brite Series Ink. The etched image-bearing print plate 14 is supported on a mounting plate 52 and may in one preferred embodiment, have a system computer controlled heating (or chilling) element 55 there within, as represented in FIGS. [10A-10C]. In another preferred embodiment, the print pad 14 is not heated, and the ink 47 in this embodiment, is at ambient temperature. The print pad 30 has its system computer temperature-controlled heating element 60 there within, as represented in FIG. [10A]. The print fixture 16 which supports the printable item 18, preferably has the system computer controlled heating (or chilling) element 55 there within as well, again, as represented in FIGS. [10A-10C]. The print pad 30 may be heated to and maintained at temperatures of about 230 to about 270 degrees F., preferably about 250 degrees F. Such temperature range varies somewhat depending on the ink being utilized, such as identified hereinabove. The respective heating elements within the support plate 52 (with that particular embodiment), the print pad 30, and the print fixture 16 are all controlled by the system central control computer 38 in conjunction with the heat control module 39 within the frame assembly 12 of the print pad machine 10 in response to the detection and monitoring of the pad 30 temperature by the articulable pad tracking heat sensor 44 or the print pad array of implanted temperature sensors 33 as represented in FIG. [10A]. The articulable heat sensor 44 embodiment and the embodiment of the inner implanted array of heat sensors 33 is within the print pad 30 is controlled through a proper circuit 42 in conjunction with the system control computer 38 and pad position sensors 40 represented in FIGS. [2 and 3], to monitor and regulate those respective temperatures, particularly the temperature of the print pad 30 so as to induce and control the thermally differentiated separate dual ink layers 50 and 52 upon their deposition into and onto the printable item 18. The thin evaporated "wetted" layer 50 being absorbed first into the item 18, and the contiguous denser layer 52 being then contiguously and simultaneously applied onto the being-printed item 18. The articulable heat sensor 44 is controllably programmed to track the transitory movement of the laterally and vertically displaceable print pad 30 during its transition from the picking up of ink 47 from the etched image bearing print plate 14 through to the concomitant deposition of multiple ink layers 50 and 52 upon the upwardly facing surface of the to-be-printed, being printable item 18, as represented in FIG. [8]. Regulation of the temperature with respect to either the articulable heat sensor 44 or to the implanted array of heat sensors 33 embedded within the print pad 30, and with respect to the print pad 30, the image bearing print plate 14 (if heat utilized there) and to the print fixture 18 are critical to the development of the dual layers 50 and 52 deposited both in and on the structure of the printable item 18. The system control computer 38 tracks the time of movement and the temperature of the print pad 30 so as to ensure compatibility and efficacy in conformance to the temperature and evaporation characteristics of the specific type of ink 47 being utilized for a particular print item application." [Bracketed material is amended language.]

Printing on Curvilinear Surfaces

Applicant admits that is possible to print a 360 degree image on a curvilinear surface having a 2 mm or less outer diameter with a conventional print pad 30 having multi-angled surfaces. It is possible because when the print pad 30 having multi-angled surfaces applies ink to the curvilinear surface having a 2 mm or less outer diameter, the print pad 30 having multi-angled surfaces pushes down to flatten the print pad 30 which in turn permits the print pad 30 to slightly rotate the curvilinear surface having a 2 mm or less outer diameter and thereby print the 360 image on the curvilinear surface having a 2 mm or less outer diameter.

Applicant has confirmed that when the curvilinear surface has an outer diameter greater that 2 mm, that a print pad 30 having multi-angled surfaces is unable to successfully print a 360 degree and clear image on the curvilinear surface having an outer diameter greater that 2 mm. As identified above, the print pad machine 10 permits the print pad 30 to move only along an x-axis and a y-axis. For example, the print pad 30—has two angled or curvilinear (as shown in FIGS. 2-10C) surfaces separated by an initial pick up/ink deposition point that is clearly identified as item 31 in FIG. 10A and item 31, 132 at FIG. 1A—is (a) properly positioned over the cliché 26 by the print pad machine 10 moving the print pad along the x-axis (see, FIGS. 3 and 4); (b) contacts the cliché 26 when the print pad machine 10 moves the print pad 30 downward along the y-axis to properly pick the ink from the cliché 26.

Properly picking up the ink from the cliché 26 calls for print pad 30 to have the initial pick up/ink deposition point 132—to provide a high angle of attack to inhibit (a) poor ink transfer and (b) capturing air bubbles in the transferred ink—positioned in the cliché 26. When the print pad 30 is pushed, by the print pad machine 10, downward into the cliché 26 as illustrated at FIG. 5, the high angle of attack permits the ink to collect on the initial pick up/ink deposition point 132 and both angled surfaces with minimal distortion of the image since the high angle of attack pushes air from being positioned between the cliché 26 and print pad 30.

Once the print pad 30 has the ink thereon (as illustrated at FIG. 10B), the print pad machine 10 moves the print pad (a) upward (y-axis) as illustrated at FIG. 6 and (b) then forward (x-axis), as illustrated at FIG. 7, toward the print fixture 16 for fixedly supporting a preferably ink absorbing printable item 18 thereon. Once the print pad 30 is properly positioned over the print fixture 16, the print pad machine 10 moves the print pad 30 downward (y-axis), as illustrated at FIG. 8, so the print pad's initial pick up/ink deposition point 132 is positioned on the product so the print pad 30 (*a*) compresses over the product to be printed, and (b) rolls outward and down onto the product in order to completely cover the printable area to transfer the ink onto the product.

When the product is a curvilinear surface having an outer diameter greater than 2 mm, the print pad 30, as previously expressed, pushes downward onto the curvilinear surface and slightly rotates the curvilinear surface. That slight rotation is insufficient to print a 360 degree image, and in particular a clean image, on to the curvilinear surface having an outer diameter greater that 2 mm.

Applicant's Printing Pads—Single Angled Silicon Pads

As previously identified, there are customized printed pads used to apply ink to particular surfaces. Applicant has used a single angled silicon print pad as illustrated at FIGS. 11A, 11B and 11C for many years to effectively apply ink against walls and raised areas. The single angled silicon pad 200, as illustrated at FIGS. 11A, 11B and 11C has

- a contact wall 202 having a contact proximal end 220 and a contact distal end 222 wherein the contact distal end 222 has a first height (H1);
- a lower wall 204 having a lower proximal end 224 and a lower distal end 226 wherein the lower distal end 226 has a second height (H2) that is less than the first height (H1);
- a first angled side wall 206 (1) interconnecting right side walls of (a) the lower wall 204 and (b) the contact wall 202 and (2) having a first side proximal end 228 and a first side angled distal end 230;
- a second angled side wall 208 (1) interconnecting left side walls of (a) the lower wall 204 and (b) the contact wall 202 and (2) having a second side proximal end 232 and a second side angled distal end 234;
- a base surface 210 that interconnects to the contact proximal end 220, the lower proximal end 224, the first side proximal end 228, and the second side proximal end 232; and
- an angled surface 240 that interconnects to the contact distal end 222, the lower distal end 226, the first side angled distal end 230, and the second side angled distal end 234 to form a high angle of attack area 242 that starts at the intersection of the top surface 240 and the contact distal end 222.

As with most print pads, the single angled print pad 200—preferably made of silicon —, through the base surface 210 is attached to a base 201 so the single angled silicon pad 200 and the base 201 can interconnect to the printed pad machine's 10 support housing 22. In the prior uses of the single angled silicon pad, the ink is applied onto the contact wall 202 near the contact distal end 222. Thereby, the ink can be and has been transferred from the single angled print pad's contact wall 202 to a product's walls and raised areas.

SUMMARY OF THE INVENTION

A printing pad machine that can print a 360 degree image on a cylindrical object. That objective is achieved by modifying a conventional printing pad machine having a support member interconnected to an overhead gantry and an adjustable and moveable actuator system and power source. The modifications include using a single angled print pad having a contact wall having a first height, a lower wall having a second height that is less than the first height, an angled surface interconnecting the contact wall's distal end and the lower wall's distal end, and a base wall (a) interconnecting the contact wall's proximal end and the lower wall's proximal end and (b) connectable to a base. Another modification includes a flexion-extension hinge positioned between (a) the support member and the base or (b) the support member and the overhead gantry and controlled by the adjustable and moveable actuator system and power source. In many embodiments the adjustable and moveable actuator system and power source are controlled through a microprocessor.

That objective can be accomplished with the conventional printing pad machine using the single angled print pad.

Both objectives can also be accomplished by adding ridges to the single angled print pad.

BRIEF DESCRIPTION OF THE DRAWINGS

FIG. 9 is a prior art side elevational view similar to that shown in FIG. 7, now representing an ink image free print pad displaced upwardly towards its support housing after having applied multiple layers onto the now printed item supported on the print fixture at the $1^{st}$ end of the print pad machine.

FIGS. 10A, 10B and 10C are schematic representations of the sequence of operation involved between the print pad, the ink-laden etched image on the print plate and ultimately the printable item supported on the print fixture ending as a multilayered image shown on and absorbed into the printable item.

FIGS. 12A and 12B, wherein FIG. 12A illustrates a single angled print pad positioned over a cliché; and FIG. 12B illustrates a single angled print pad positioned on the cliché that transfers the image in the cliché to toe single angled print pad.

FIGS. 13A and 13B, wherein FIG. 13A illustrates a single angled print pad initial contact with a curvilinear surface of a tubular product; and FIG. 13B illustrates a single angled print pad in the middle of the process of transferring an image on the curvilinear surface of a tubular product so the image can be 360 degrees on the curvilinear surface of a tubular product.

DETAILED DESCRIPTION OF THE INVENTION

Single Angled Print Pad

Figure 1A:
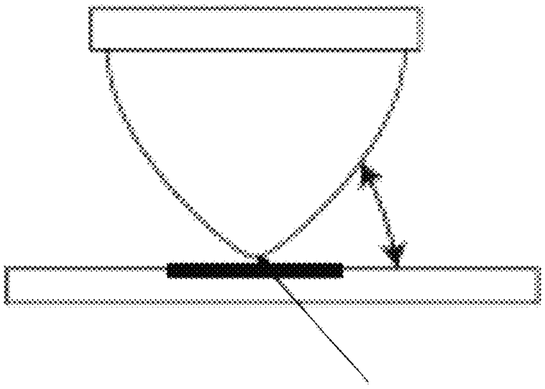
Fig. 1A (Prior Art)
FIG. 1A illustrates a prior art printing pad having a high angle of attack.
Figure 1B:
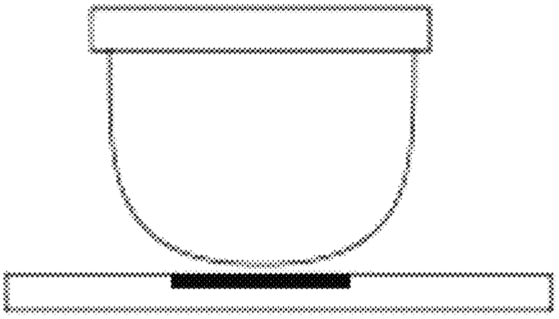
Fig. 1B (Prior Art)
FIG. 1B illustrates a prior art printing pad having flat-surfaced or low-profile which has known problems with picking up ink and applying ink to surfaces.
Figure 2:
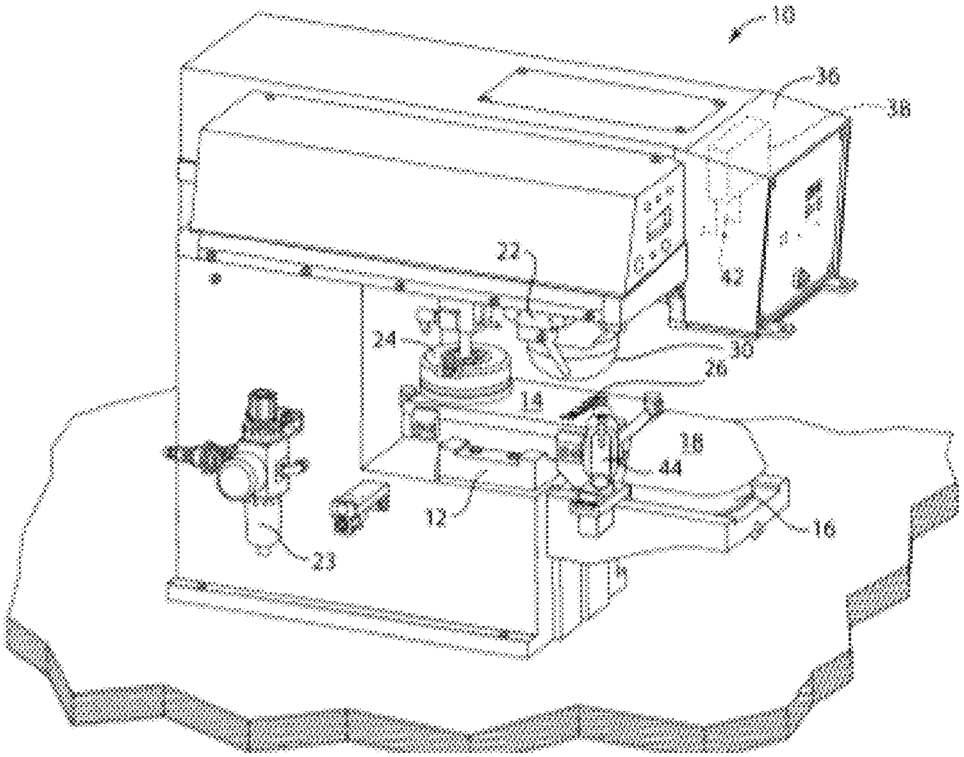
Fig. 2 (Prior Art)
FIG. 2 is a prior art perspective view of a print pad machine constructed according to the principles of the present invention.
Figure 3:
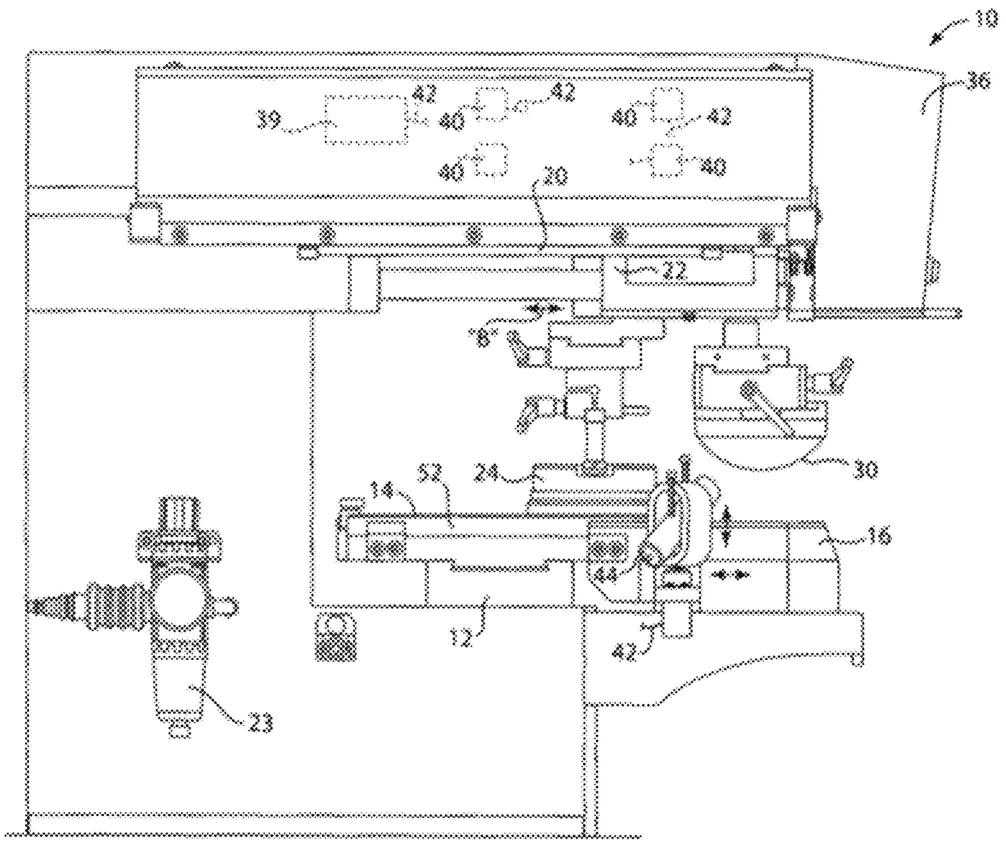
Fig. 3 (Prior Art)
FIG. 3 is a prior art side elevational view of the print pad machine shown in FIG. 2, with its ink cup ink supply mechanism shown slideably disposed over the image bearing print plate for deposition of a quantity of ink within the etched image thereon, with the tandem movable print pad awaiting further motion of the support housing to enable the next step in the operational sequence.
Figure 4:
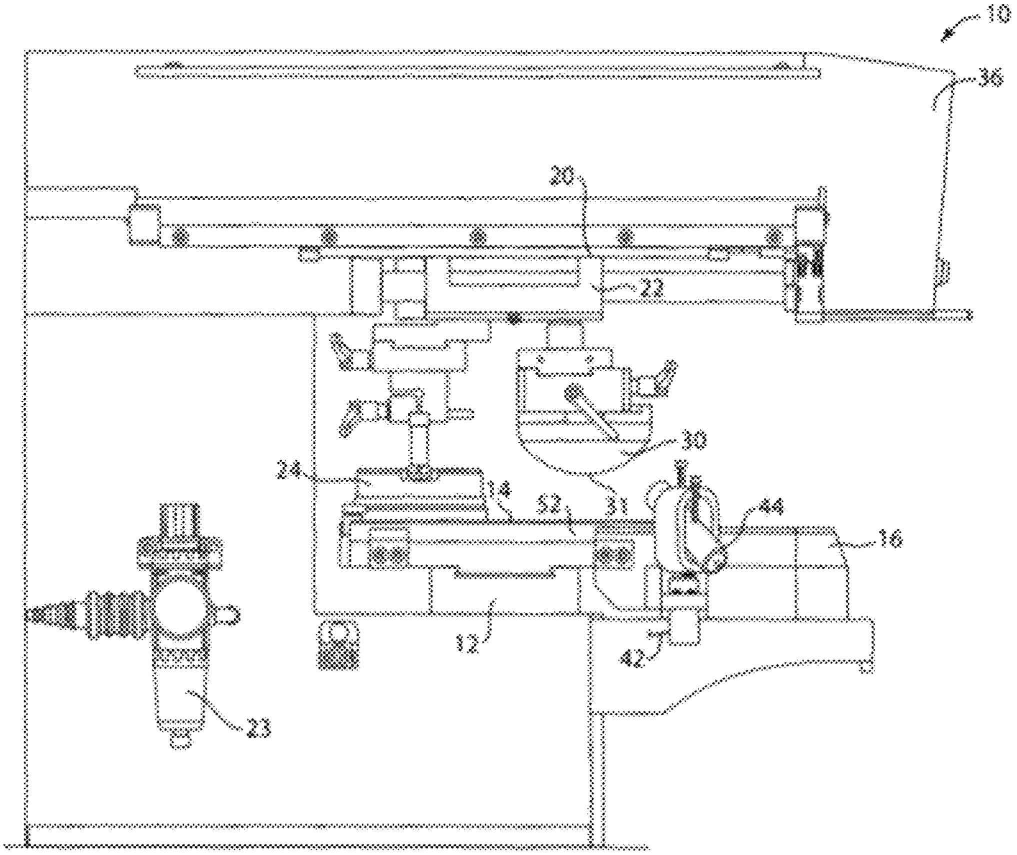
Fig. 4 (Prior Art)
FIG. 4 is a prior art side elevational view similar to that shown in FIG. 3 showing the ink cup ink supply mechanism slideably disposed over the rear portion of the image bearing print plate and its correspondingly moved print pad shown supported above the ink laden etched image of the print plate.
Figure 5:
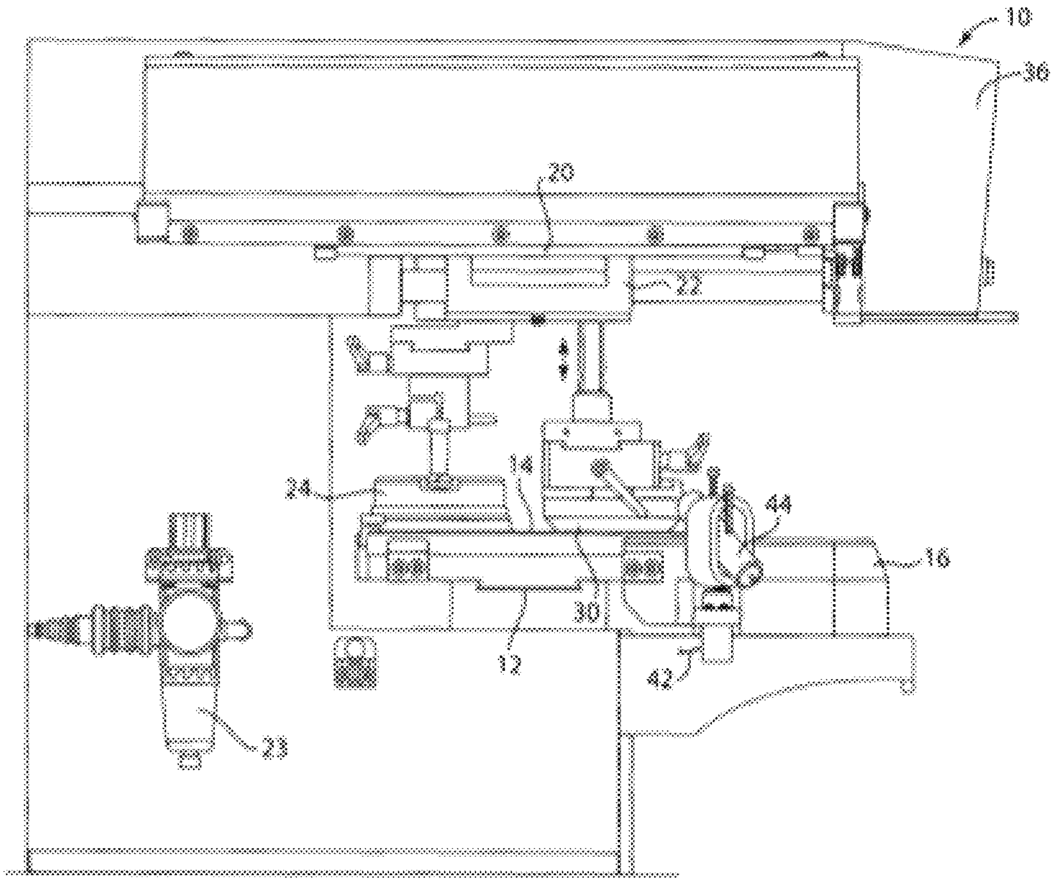
Fig. 5 (Prior Art)
FIG. 5 is a prior art side elevational view similar to that shown in FIG. 4, now showing the print pad displaced vertically from the support housing there above, to enable the print pad to pick up its quota of ink from the etched inkwell image.

The present invention uses that single angled print pad 200 which can be made of silicon or any other effective material that permits the transfer of ink from (a) a cliché to the print pad; and (b) the print pad to a product— to be capable of applying a 360 degree, clean image onto a curvilinear surface of a tubular or cylindrical product—like a catheter—wherein the tubular or cylindrical product can have an outer diameter greater than 2 mm. The method of using the single angled print pad 200 differs from the prior art method of using the single angled print pad 200. With the present invention, the ink is transferred from the cliché 26 (a.k.a., printing plates that can be made of metal like steel, or plastic) onto the angled surface 240 and optionally the initial pick up/ink deposition point 132 (which should be at or near the lower distal end 226 as identified, for example, at FIG. 13B or not be at the lower distal end 226 as identified, for example, at FIG. 12B), and NOT onto the contact wall 202. The angled surface 240 must also have a length (L) equal to or greater than the circumference of the curvilinear surface of the tubular product in order to print the 360 degree, clean image on to the curvilinear surface of the tubular product.

Figure 12A:
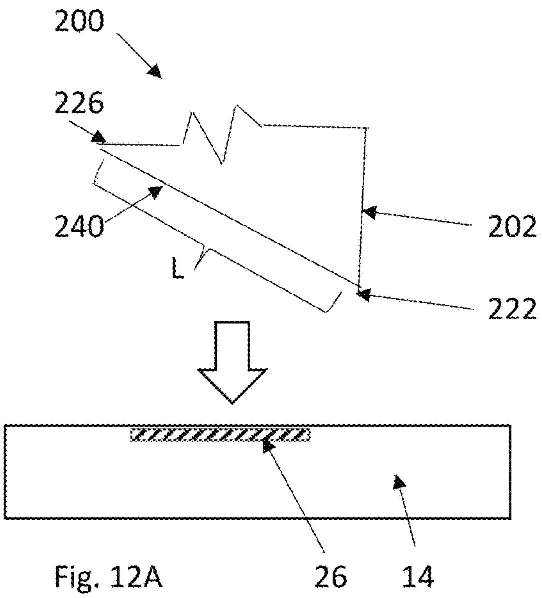
Figure 12B:
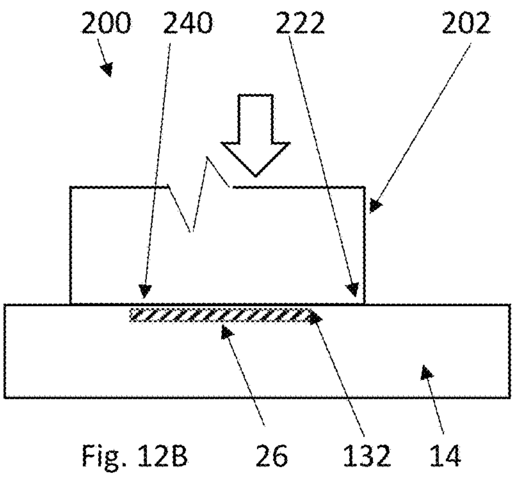

The method of using the angled print pad 200 to apply the 360 degree, clean image on to the curvilinear surface of the tubular product with a conventional print pad machine 10; entails three steps:

First—Ink is transferred from a cliché 26 onto the angled surface 240. That transfer of ink from the cliché 26 to the single angled print pad 200 is accomplished by positioning the initial pick up/ink deposition point 132 at or near one end of the cliché and the angled surface 240 covering the remainder of the cliché 26 as shown in FIG. 12A. The conventional print pad machine 10 pushes the single angled print pad 200 downward in a conventional method to transfer a clean, bubble-free image onto the single angled print pad 200 as shown in FIG. 12B. Once the ink image is transferred to the single angled print pad 200; the conventional print pad machine 10 lifts the single angled print pad 200 from the cliché 26 toward a first plane 500—that permits the print pad 200 to move back and forth between locations positioned over the engraved print plate 14 and the print fixture plate 16 through the overhead gantry 20 and the support housing 22 as clearly illustrated at FIG. 6.

Figure 6:
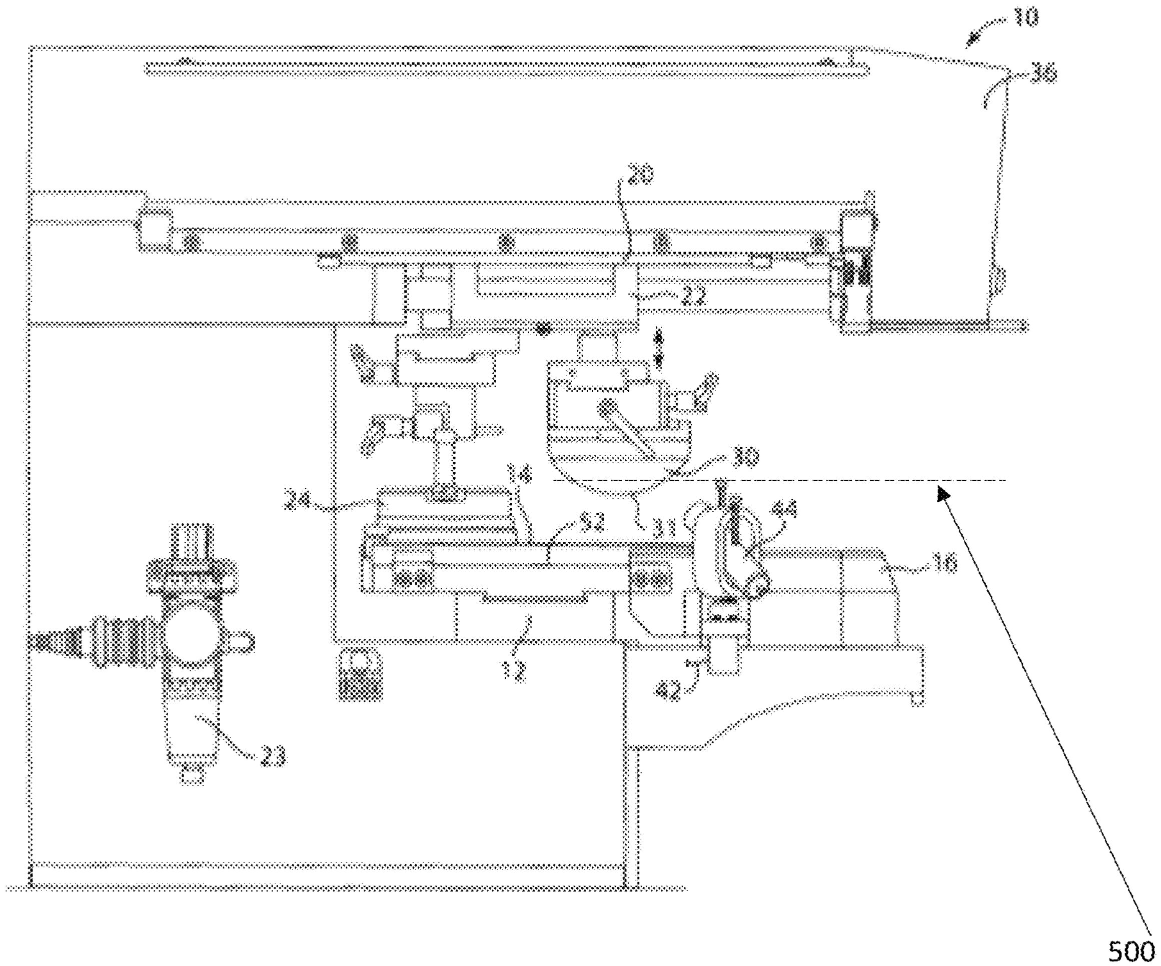
Fig. 6 (Prior Art)
FIG. 6 is a prior art side elevational view similar to that shown in FIG. 5, now showing the ink image laden print pad displaced vertically towards the support housing there above, awaiting its next transition in the operational sequence.
Figure 7:
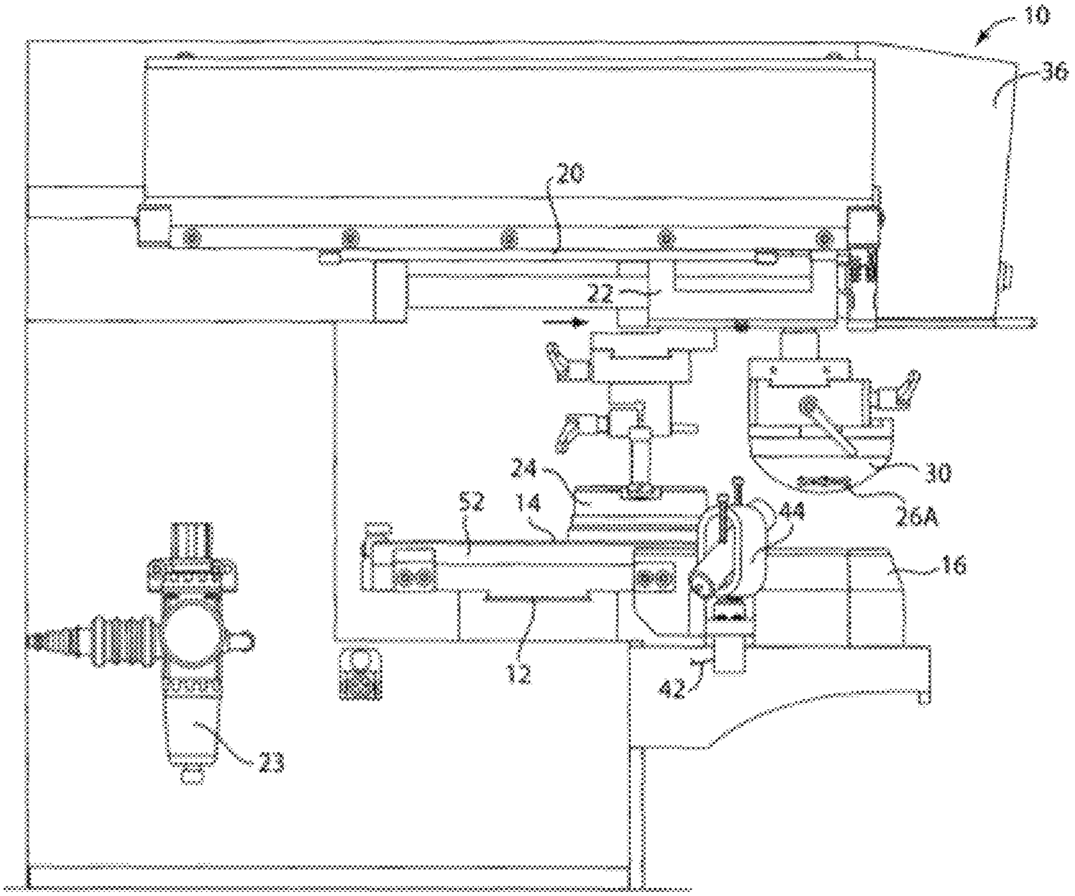
Fig. 7 (Prior Art)
FIG. 7 is a prior art side elevational view similar to that shown in FIG. 3, now showing the ink-image-laden print pad disposed vertically above the to be printed item supported on the print fixture at the $1^{st}$ end of the print pad machine.

Second—The inked single angled print pad 200 is then moved—in the illustrated embodiment, horizontally—by the print pad machine 10 through the overhead gantry 20 and the support housing 22, toward the curvilinear surface of the tubular product 250 positioned on the print fixture plate 16, similar to the process illustrated at FIGS. 6 and 7.

Figure 8:
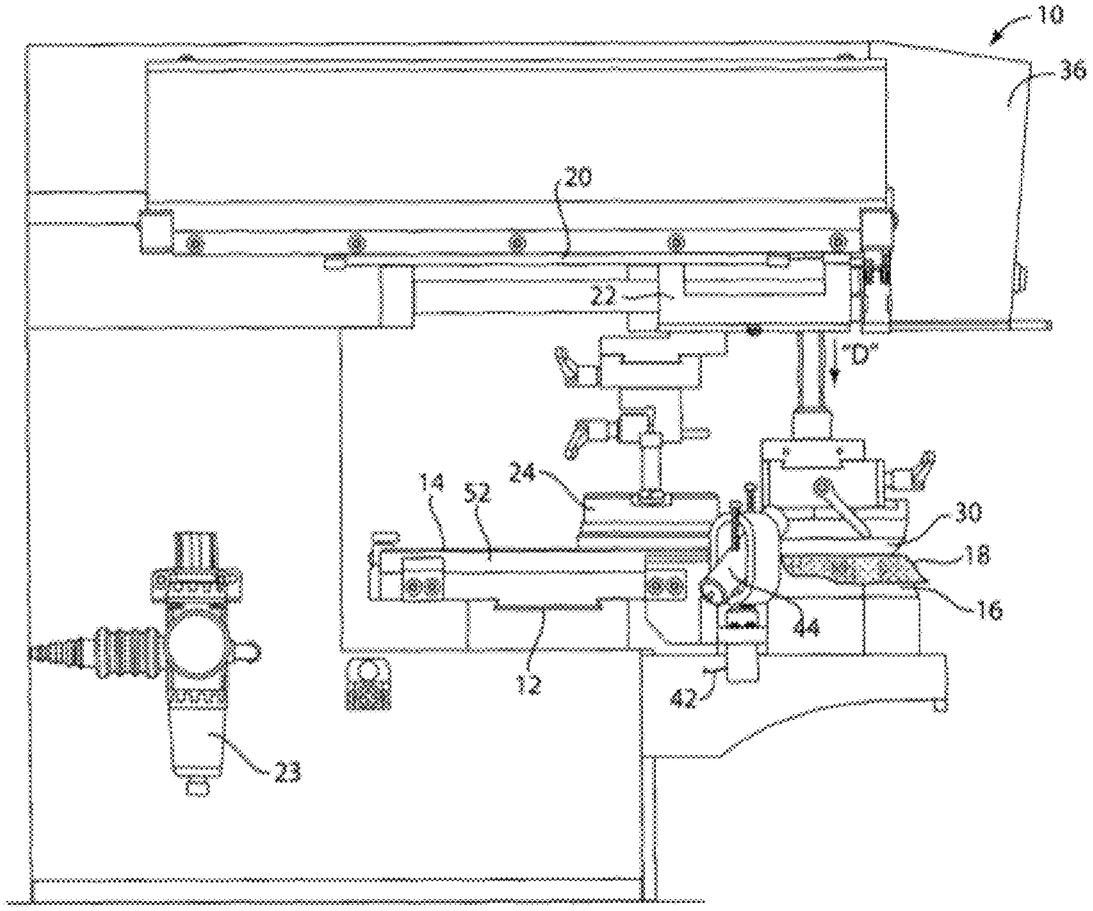
Fig. 8 (Prior Art)
FIG. 8 is a prior art side elevational view similar to that shown in FIG. 7, now showing the ink image laden print pad displaced downwardly from the support housing and against a printable item supported on the print fixture.
Figure 11A:
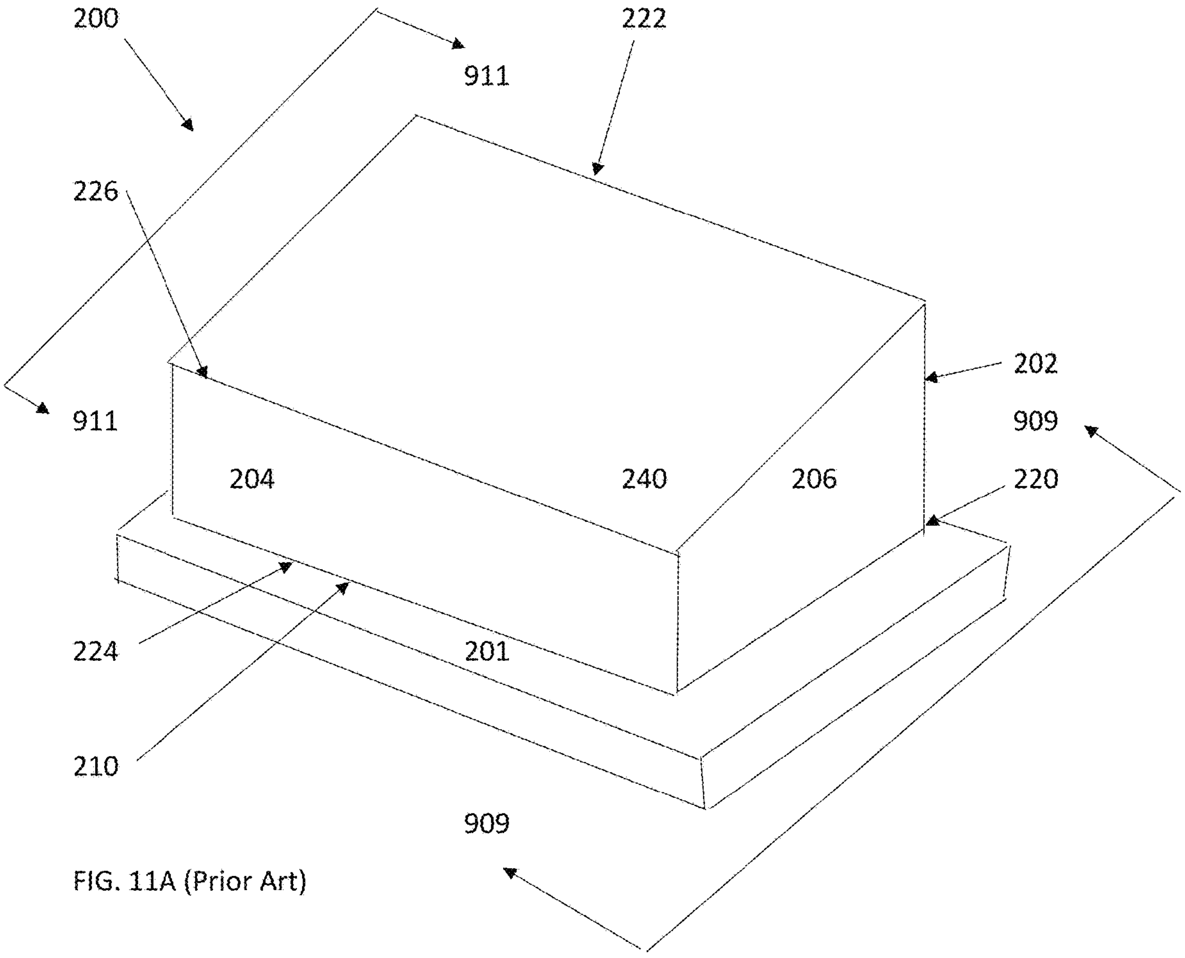
FIG. 11A (Prior Art)
FIG. 11A illustrates a prior art single angled print pad.
Figure 11B:
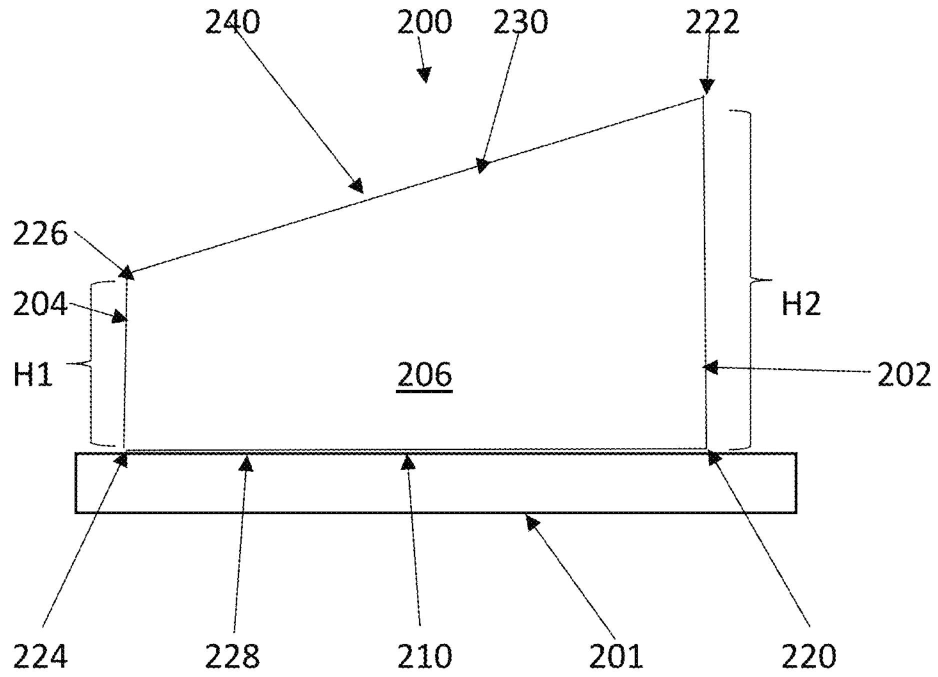
Fig. 11B (Prior Art)
FIG. 11B illustrates FIG. 11A taken from the view defined by line 909-909.
Figure 11C:
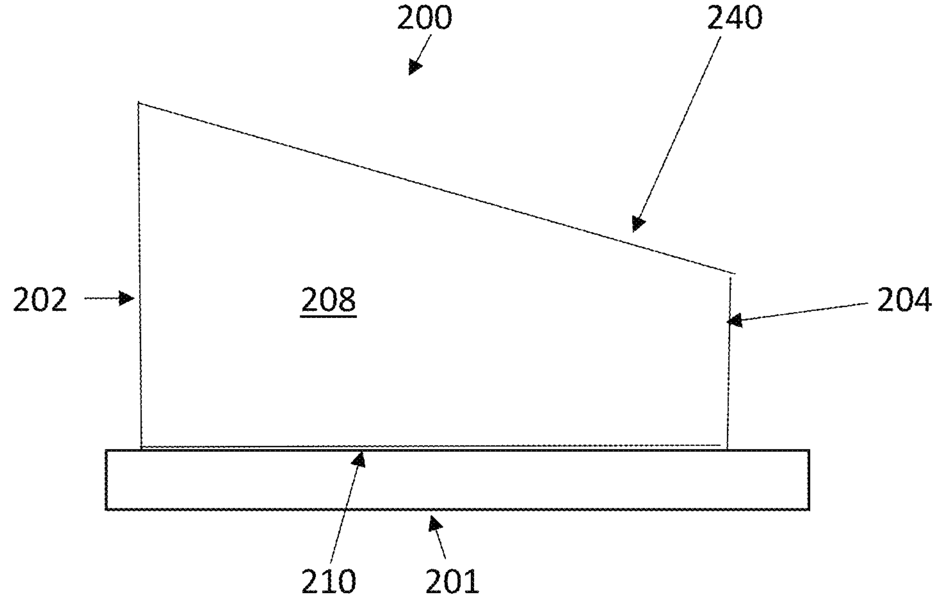
Fig. 11C (Prior Art)
FIG. 11C illustrates FIG. 11A taken from the view defined by line 911-911.
Figure 13A:
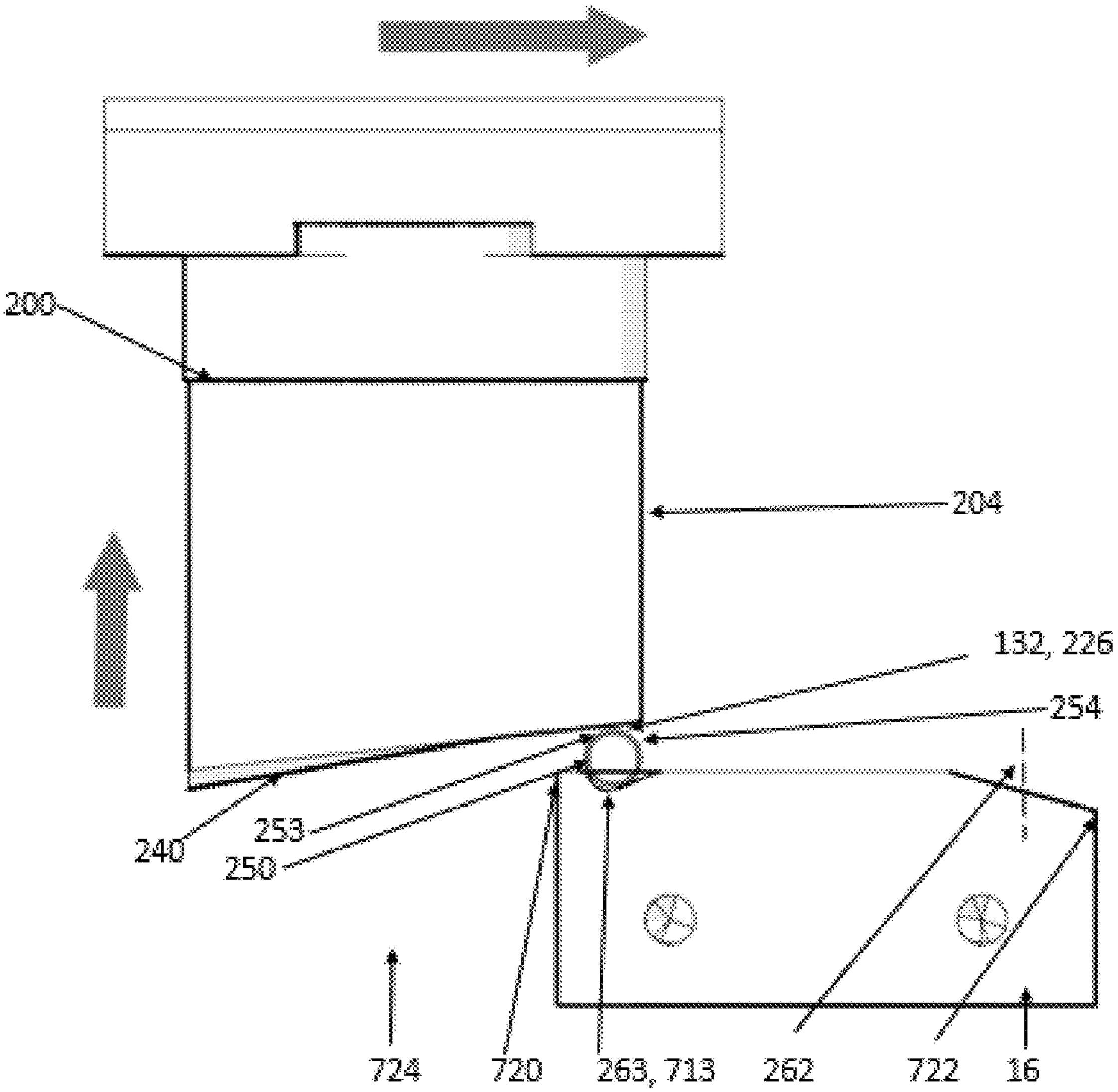

Third—The inked single angled print pad 200 is then moved vertically toward the curvilinear surface of the tubular product 250, similar to the process illustrated at FIGS. 7 and 8. In this step, however, the initial pick up/ink deposition point 132 (at, near or toward the lower distal end 226) is positioned on the curvilinear surface of the tubular product's 250 apex 253 or off-apex point 254. The off-apex point 254 is when the angled surface 240 is positioned above the apex 253 as illustrated at FIG. 13A.

The print fixture plate 16 has a length that permits the tubular product 250 to be printed thereon. Preferably, the print fixture plate's length is greater than the tubular product's length so that a portion of the tubular product's length is capable of contacting the print fixture plate 16 when the tubular product 250 is being printed thereon.

To assist in that printing endeavor, the print fixture plate 16 has a groove 713 that extends along the entire or a part of (must still contain the tubular product) the print fixture's length. The groove 713 is capable of positioning and at least partially receiving a tubular product 250. Preferably, the tubular product 250 that fits within the groove 713 has a diameter ranging from 2 mm to 4 inch. Now the groove 713 is designed to place the tubular product 250 in the proper and appropriate position when the inked single angled print pad 200 initiates the printing process on the tubular product 250.

The print fixture plate 16 has a width 719 wherein the distance between the groove 713 (positioned near the plate's proximal end 720) and the plate's distal printing end 722 is greater than the tubular product's circumference distance of the tubular product's outer diameter to ensure the printing on the tubular product is uniform and efficient. In addition, positioned adjacent to the plate's proximal end 720 is a pad cavity 724.

The groove 713 has a depth that permits (i) the tubular product's 250 apex 253 or off-apex point 254 to be contacted by the inked single angled print pad's 200 lower distal end 226 and (ii) the angled surface's contact distal end 222 (*a*) not contact the print fixture plate 16 and (b) preferably, be positioned in the pad cavity 724. The pad cavity 724 can be, depending on the design of the print pad machine 10, positioned over the image-displaying print plate 14 that holds the cliché 26.

When the tubular product 250 is positioned in the groove 713 and preferably having one end contact an align wall 739 to ensure the tubular product 250 is properly positioned in the groove 713, the tubular product is in its initial position 263 for the printing process.

Figure 13B:
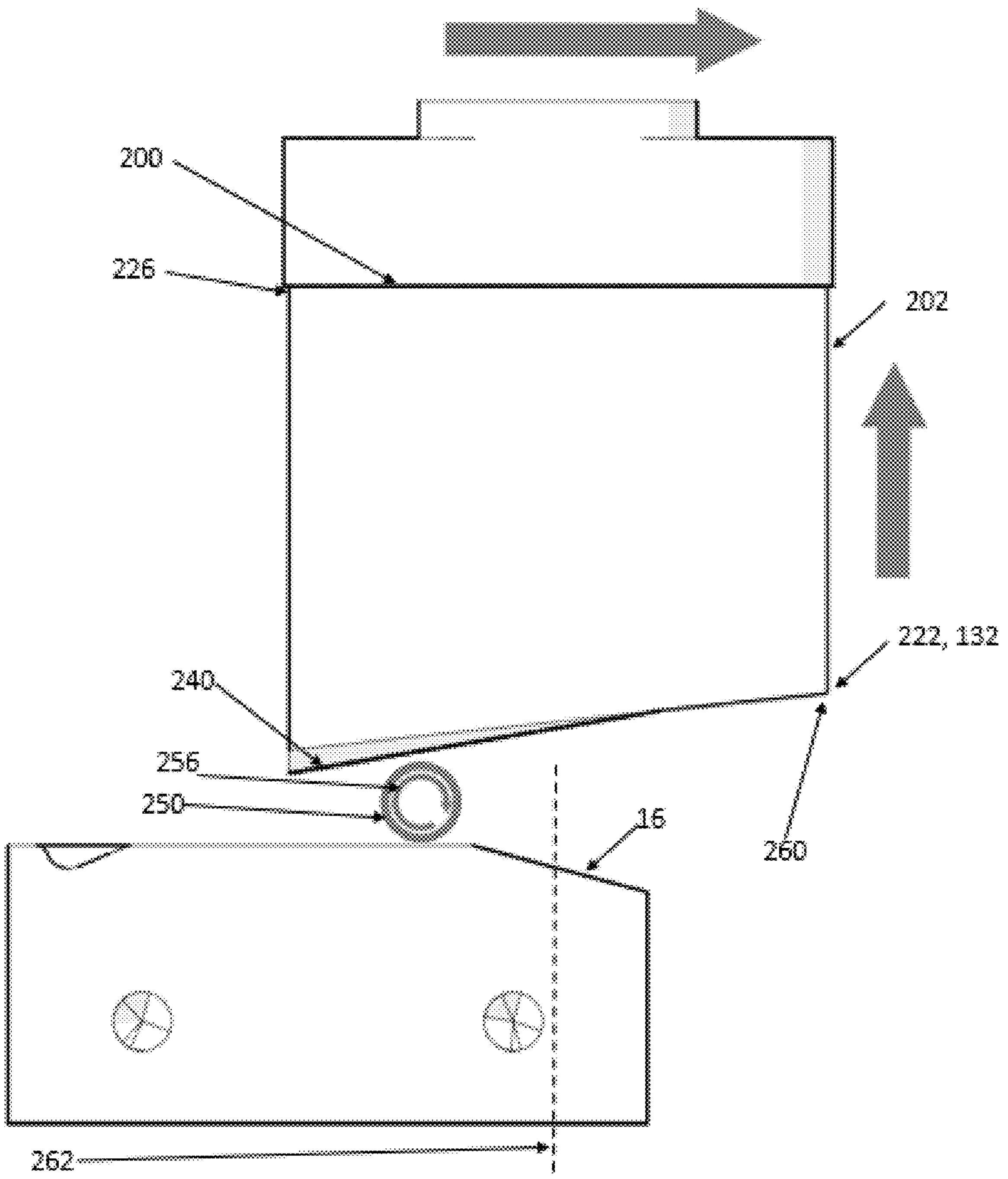

The print pad machine 10 then drives, as illustrated at FIG. 13B, the inked single angled print pad 200 (*a*) upward away the print fixture 16 and simultaneously (b) horizontally toward the plate's distal printing end 722. That way, the inked single angled print pad 200, in particular the angled surface 240, maintains contact with the tubular product 250 as the tubular product 250 (also identified as 250A when ink 721 is applied to the tubular product) rotates (arrow represented by number 256) (i) out of the groove and (ii) along the print fixture plate 16 toward the plate's distal printing end 722. As the tubular product 250 rotates toward the plate's distal printing end 722, and possibly beyond, a point 262 on the print fixture 16 that would be positioned below the angled surface's contact distal end 222 as the pad 200 moves horizontally toward the plate's distal printing end 722.

To decrease the chance that the ink 721 will be smudged and/or smeared during the process that ink is being applied to the tubular product 250, the print fixture plate 16 can have a plurality of interspaced friction material ribs 733 as shown at FIGS. 21A, 21B, 21C and 21D. The ribs 733 extend (a), as illustrated in the grooved embodiment of FIGS. 21A, 21B and 21C, from the distal end of the groove 713 toward the plate's distal printing end 722; and (b), as shown in the non-grooved embodiment of FIG. 21D from or near the plate's proximal printing end 720 toward the plates distal printing end 722. The area between each interspaced ribs 733 is a printing recess cavity 735. Each rib 733 is positioned so each rib 733 contacts an area of the tubular product 250 that does or should not have ink applied thereon. Likewise each printing recess cavity 735 is designed to be positioned below an area of the tubular product that does or is expected to have ink applied thereon to decrease the chance that the ink will be smudged and/or smeared. The ribbed print fixture plate version 16 (FIG. 21D and also FIG. 21C) and the ribbed-groove print fixture plate 16 version (FIGS. 21A, 21B, and 21C) can be utilized in all embodiments of the present invention to decrease ink smudging or smearing.

The rotation 256 and the movement from point 263 toward (and possibly beyond) point 262 on the print fixture 16 permits the transfer of ink from the inked single angled print pad 200 to the curvilinear surface of the tubular product 250 having an outer diameter less than, equal to, and greater than 2 mm. Those movements also permit the print pad machine 10 to have the capability to apply a 360 degree image on the curvilinear surface of the tubular product 250, and preferably a clean, 360 degree image on the curvilinear surface of the tubular product 250. The 360 degree image can be, for example, a line to act as an indicia for the amount of fluid in a catheter.

Printing Pad Machine

The printing pad machine 10 can be altered to have a flexion-extension hinge 260—for example and not limited to a hinge joint or a ball & socket joint—positioned between the base 201 and the printed pad machine's 10 support housing 22 or (b) the slideably moving support housing 22 to the overhead gantry 20 (not shown but operates in the same function, way and means as when the hinge is directly connected to the base 201 but alters the position of the slideably moving support housing 22); and in particular directly attached to the base 201 to ensure the proper position of the single angled print pad 200.

As identified above, the printed pad machine 10 controls the support housing 22 horizontal (back and forth) and vertical (up and down) movements. With the same, modified or similar but different electrical components, the printed pad machine 10 controls the flexion movements and extension movements of the flexion-extension hinge 260.

Figure 14:
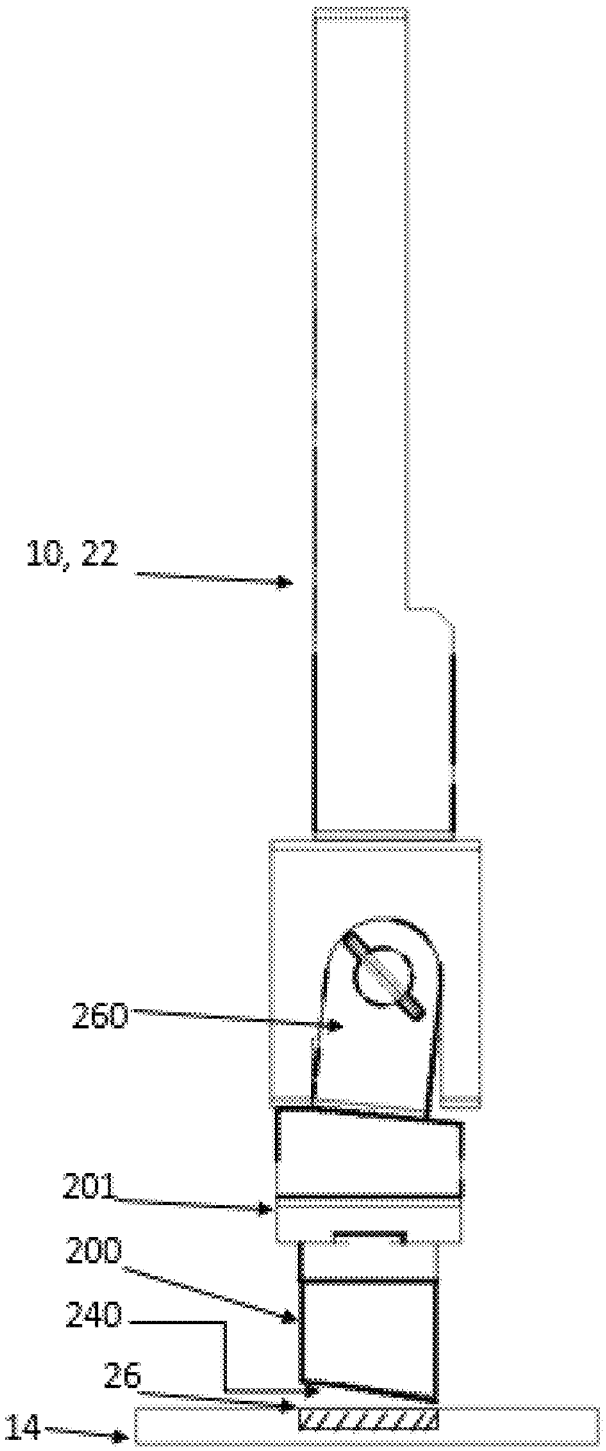
FIG. 14 illustrates the position of a single angled print pad interconnected to a flexion-extension hinge when picking ink from a cliché.

As noted above, the print pad 200 maintains a high angle of attack when the print pad 200 is going to pick up ink in the cliché 26 to diminish the transfer of smudged or defective image transfer from the cliché 26 to the angled surface 240 as illustrated in FIGS. 12A and 12B. That means, the base 201 should be, and preferably is, parallel or essentially parallel with the image-displaying print plate 14 that holds the cliché 26 as illustrated at FIG. 14.

Figure 15:
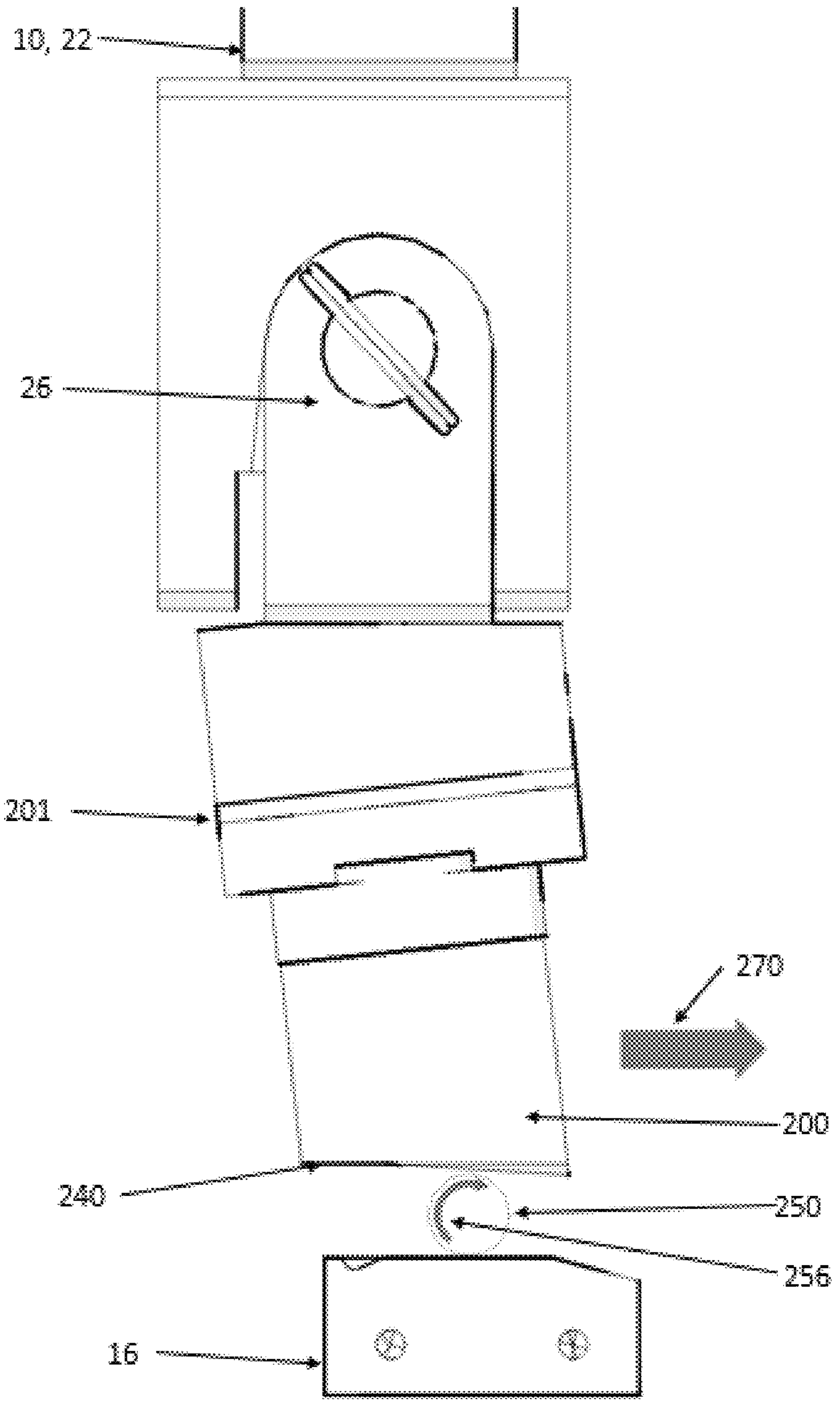
FIG. 15 illustrates the position of a single angled print pad interconnected to a flexion-extension hinge when applying ink to a product.

After the ink is successfully transferred from the cliché 26 to the angled surface 240 and the angled surface 240 does not and will not contact the image-displaying print plate 14 and prior to the print pad 200 contacting the curvilinear surface of the tubular product 250; the printed pad machine 10 alters the flexion-extension hinge 260 configuration so the angled surface 240 is parallel or essentially parallel with the print fixture 16 as illustrated at FIG. 15.

Once the angled surface 240 contacts the curvilinear surface of the tubular product 250, the printed pad machine 10 has the support housing 22 move forward (as identified by arrow 270) which in turn moves the angled surface 240 forward. When the angled surface 240 moves forward when contacting the curvilinear surface of the tubular product 250, the curvilinear surface of the tubular product 250 is able to rotate, as illustrated in FIG. 15, clock-wise 256 from at or near the angled surface's contact distal end 222 toward (and possibly beyond) the angled surface's lower distal end 226.

Alternatively, the curvilinear surface of the tubular product 250 could be positioned near the angled surface's lower distal end 226. When that occurs, the printed pad machine 10 has the support housing 22 move backward (as identified by arrow 271) which in turn moves the angled surface 240 backward. When the angled surface 240 moves backward when contacting the curvilinear surface of the tubular product 250, the curvilinear surface of the tubular product 250 is able to rotate, as illustrated in FIG. 16, counter clock-wise 257 from at or near the angled surface's lower distal end 226 toward (and possibly beyond) the angled surface's contact distal end 222.

These mechanical designs of moving forward and/or backward when transferring ink from the angled surface 240 to the tubular product 250 provides greater latitude in printing images on the curvilinear surface of the tubular product 250.

Figure 16:
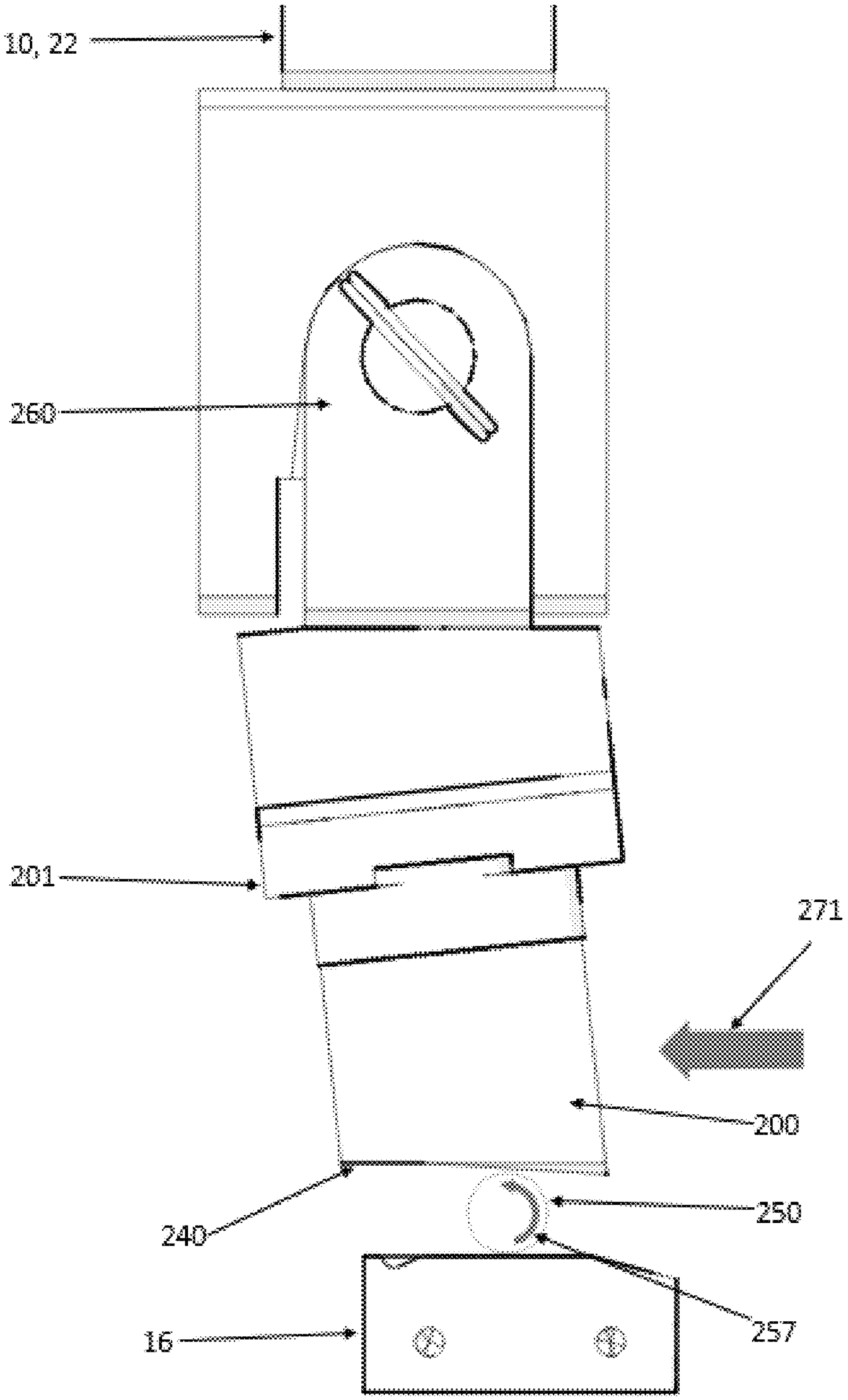
FIG. 16 illustrates an alternative position of a single angled print pad interconnected to a flexion-extension hinge when applying ink to a product.
Figure 17:
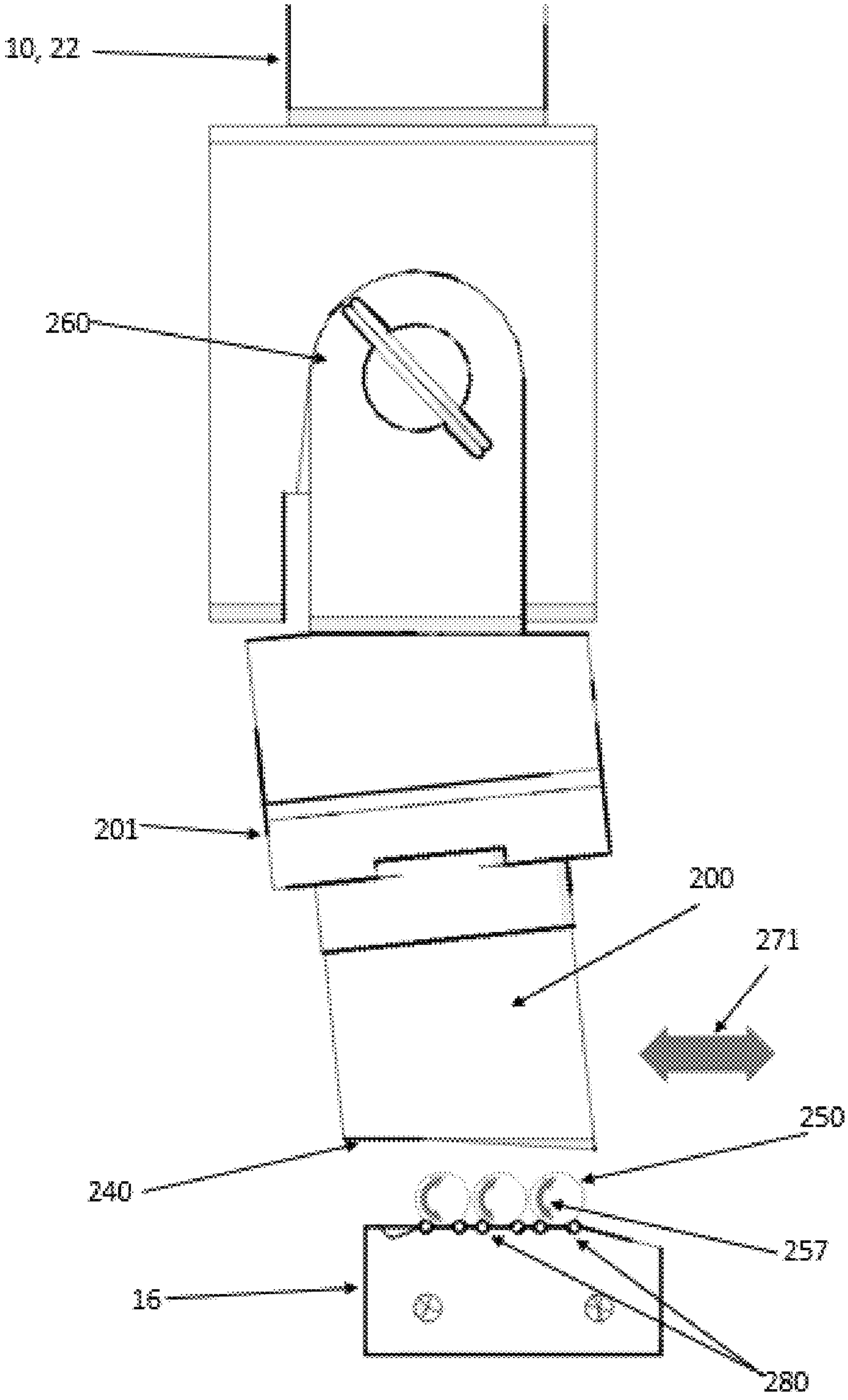
FIG. 17 illustrates another alternative position of a single angled print pad interconnected to a flexion-extension hinge when applying ink to a product that is position in one location.

As shown in FIG. 17, the curvilinear surface of the tubular product 250 can be positioned in place with ball-bearings and/or rollers 280 as the angled surface 240 moves forward or backward as described in relation to, respectively FIGS. 15 and 16, so the curvilinear surface of the tubular product 250 can then, respectively, rotate clock-wise or counter clockwise in place.

Each of the ink applying horizontal movements described and illustrated in relation to FIGS. 15, 16, 17 permits the print pad machine 10 to have the capability to apply a 360 degree image on the curvilinear surface of the tubular product 250, and preferably a clean—decreased chance of blemishes—, 360 degree image on the curvilinear surface of the tubular product 250. The 360 degree image can be, for example, a line to act as an indicia for the amount of fluid in a catheter. These ink applying horizontal movements in relation to the ink applying vertical movement illustrated in (a) the prior art FIGS. 2 to 10C and (b) FIGS. 13A and 13B for using a single angled print pad 200; diminish the wear and tear for any printing pad, in particular a single angled print pad 200. The diminished wear and tear is accomplished by reducing the force applied to the print pad when applying the ink to the curvilinear surface of the tubular product 250.

In the embodiment illustrated at FIG. 17, there can be multiple tubular products 250 wherein each tubular product 250 is positioned in place with ball-bearings and/or rollers 280 on the print fixture 16. Thereby, multiple tubular products 250 can be inked at the same time.

Variations

Figure 18:
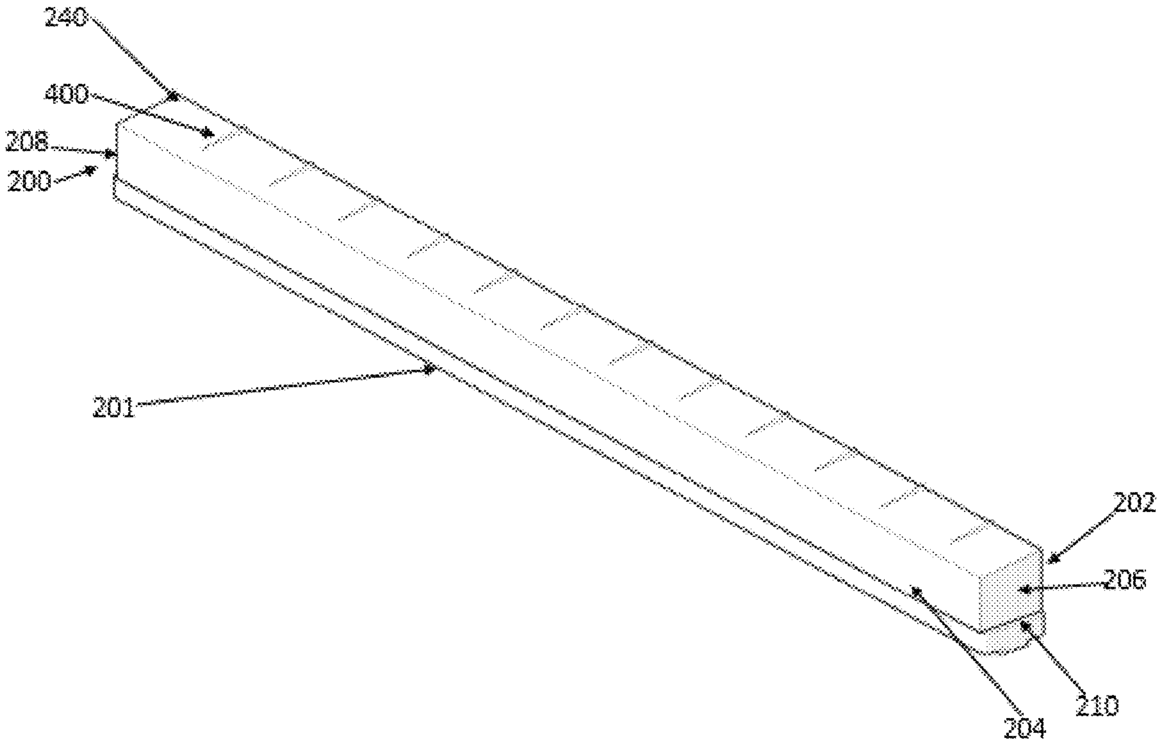
FIG. 18 illustrates a single angled print pad with ribs on a base.

The single angled print pad 200 can also have ridges or ribs 400 on the angled surface 240 as illustrated at FIG. 18. The ridges 400 could be the only surface on the angled surface 240 that applies ink to a product as described above.

The single angled print pad 200, as described above, has four sides with the base surface 210 and the angled surface 240. Those four sides, as taken from a top view, have a perimeter that illustrates a quadrilateral configuration. Obviously, the quadrilateral configuration can be any of the special quadrilateral configurations—for example and not limited to a square, a rectangle, a rhombus, a parallelogram, a trapezoid (also referred to as a trapezium), and a kite. Whatever the perimeter shape of the sides, the single angled print pad 200 must have an angled surface 240 and accomplish the objective of applying ink to a product as described above.

Figure 19:
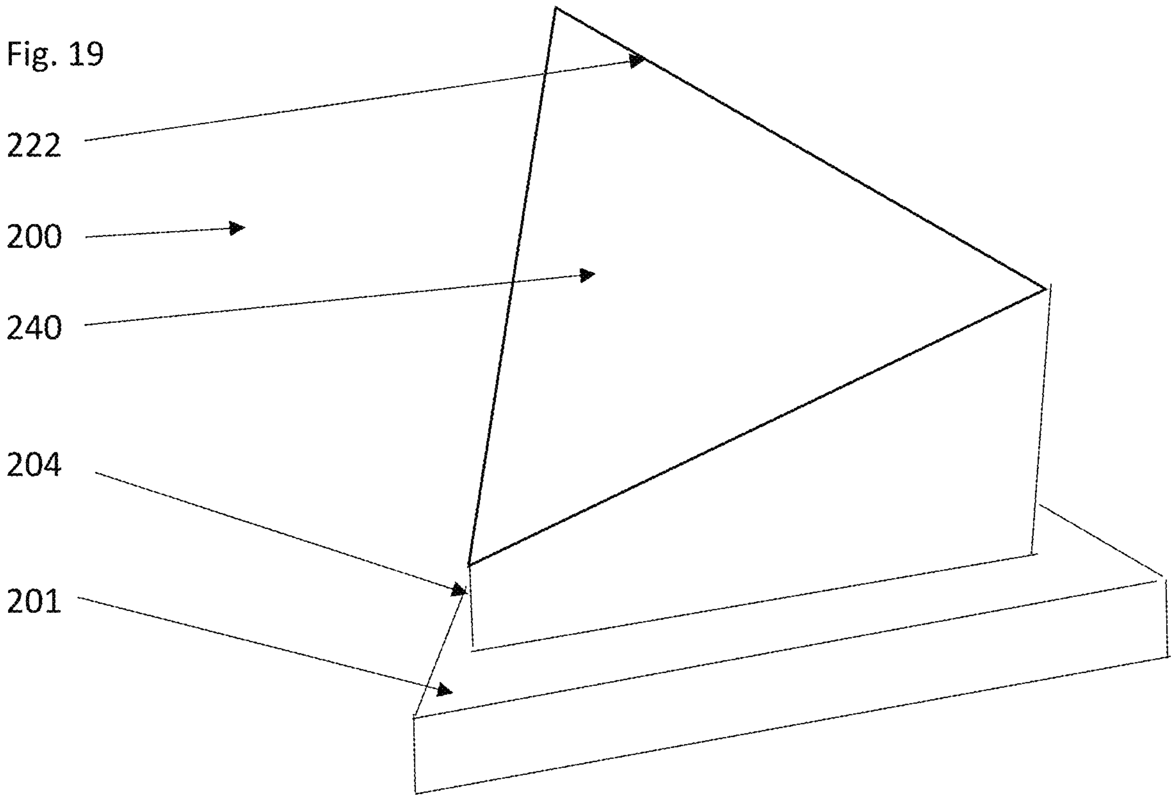
FIG. 19 illustrates an alternative embodiment of the single angled print pad with a triangular angled surface.
Figure 20:
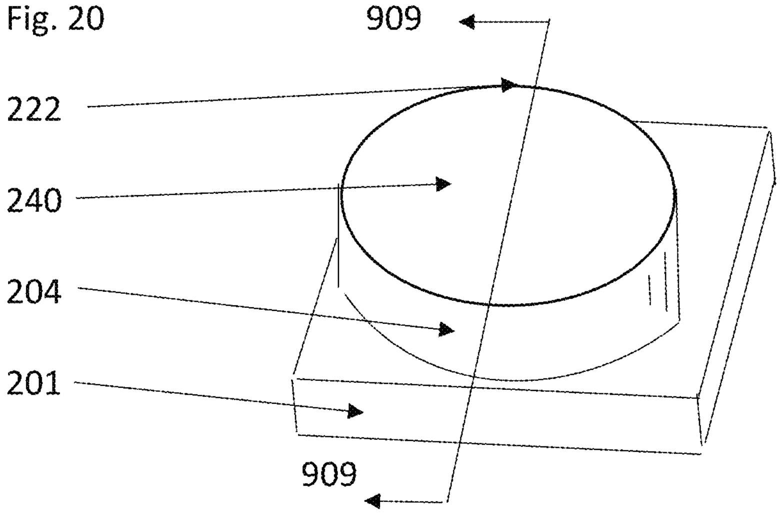
FIG. 20 illustrates an alternative embodiment of the single angled print pad with a circular angled surface.
Figure 21A:
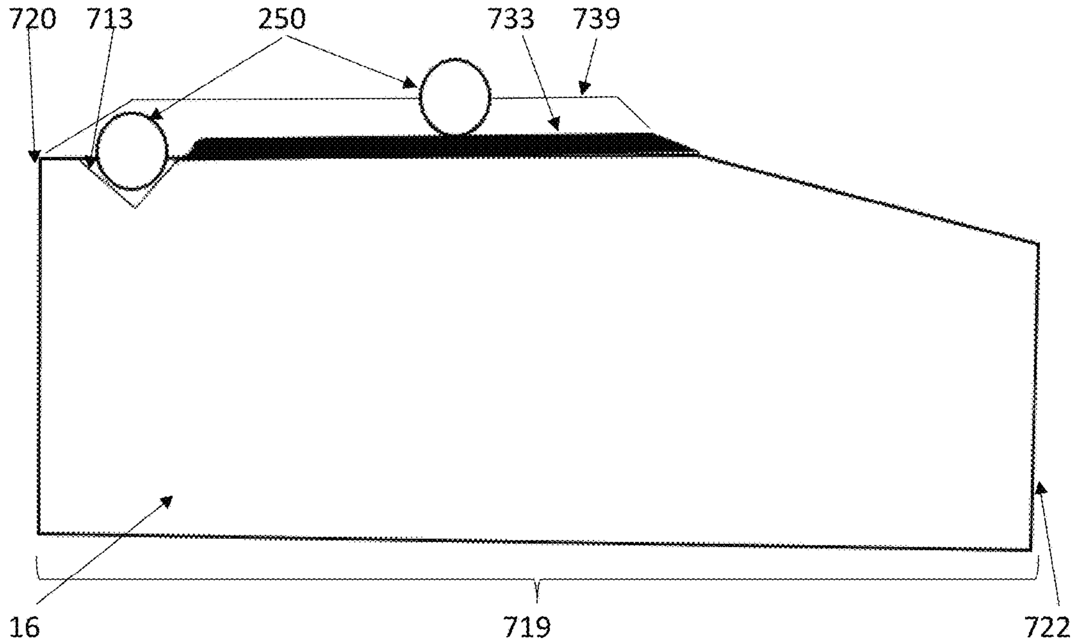
FIG. 21A illustrates a print fixture plate having interspaced ribs and groove.
Figure 21B:
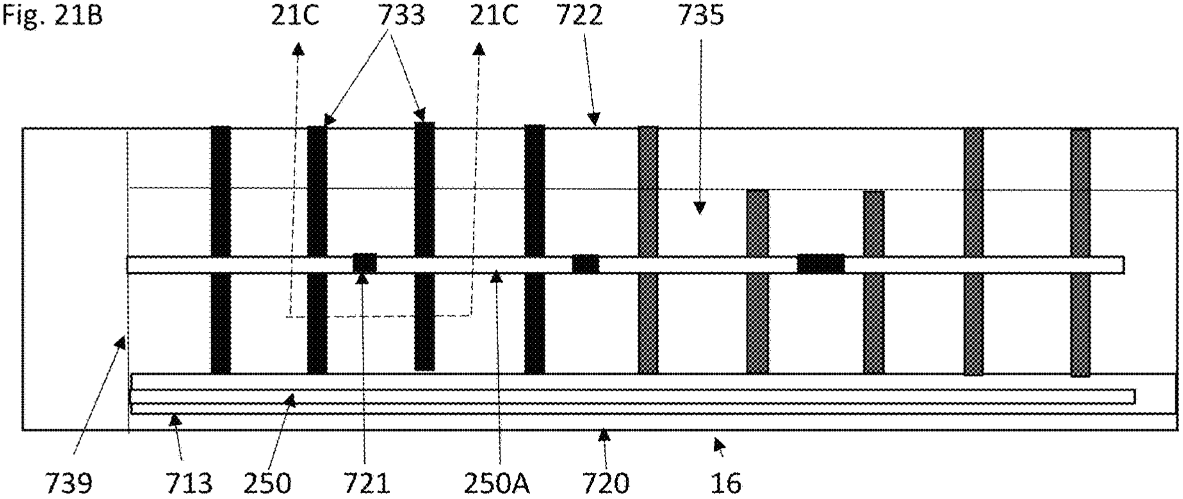
FIG. 21B illustrates a top view of FIG. 21A.
Figure 21C:
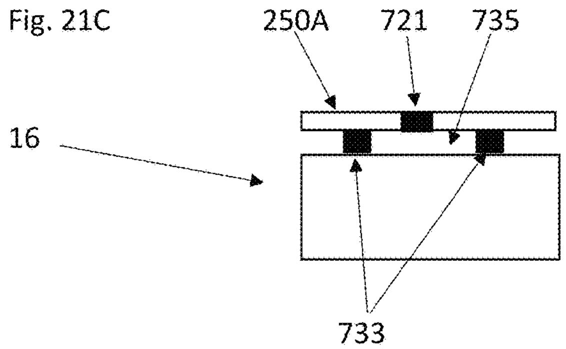
FIG. 21C illustrates cross-sectional view of FIG. 21B taken along the lines 21-21.
Figure 21D:
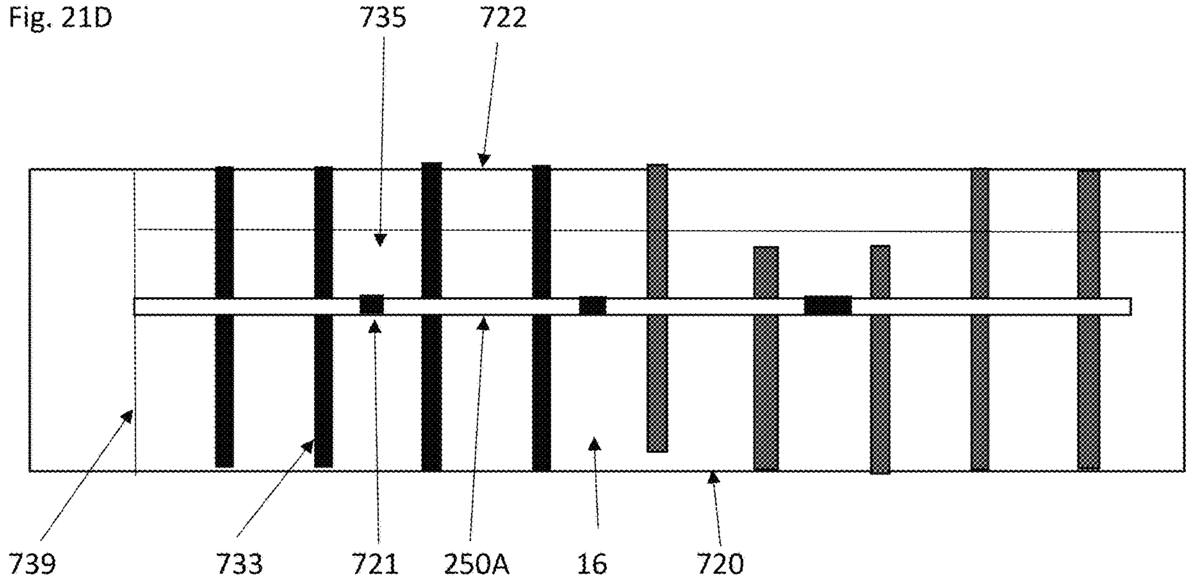
FIG. 21D illustrates an alternative embodiment of FIG. 21B without a groove.

Obviously, the single angled print pad 200 can have additional sides. That means the perimeter shape of the sides, as taken from a top view, can be a pentagon, hexagon, heptagon, octagon, nonagon, decagon and so on. Also the single angled print pad 200 can have less sides so it can be shaped like a triangle (see, FIG. 19) or a circle (see, FIG. 20). Again, whatever the perimeter shape of the sides, the single angled print pad 200 must have an angled surface 240 and accomplish the objective of applying ink to a product as described above.

The pneumatic system disclosed in the prior art—gantry 20 supports the pneumatically empowered longitudinal sliding of the support housing 22—can be replaced by any device that can adjust the hinge 260 and move the support housing 22 or move and adjust the support housing that is interconnected to the gantry 20 through the hinge 260. Examples of adjustable and moveable actuator system and power sources include and are not limited to the previously disclosed pneumatic actuator system, a manually driven by hand (not a preferred method), a hydraulic actuator system, an electromechanical actuator system, and combinations thereof. A version of the electromechanical actuator system is an electronic cylinder system having (a) at least one linear motor based on a tubular design, using high-flux annular magnets on an actuator rod, surrounded by a series of specialized windings on a long stator coil, or (b) a linear motor design having a fixed stator contain permanent magnets and the moving element contains the coil windings. The pneumatic actuator system, the hydraulic actuator system and the electromechanical actuator system can each be controlled through the microprocessor having an input station that permits a third party to enter parameters and instructions that control the adjustable and moveable actuator system and power source.

The prior art's ink supply cup 24 is a source to hold ink; and that cup can be replaced by an open ink well system. The open ink well system is older technology than the ink supply cup system, but it is effective.

Although the preferred embodiment has been described in detail, it should be understood that various changes, substitutions and alterations can be made therein without departing from the spirit and scope of the invention as defined by the appended claims.

I claim:

1. A printing pad machine having an elongated frame and support assembly comprising:

(A) an engraved print plate having an engraved image thereon, the engraved image is capable of (a) containing transferable ink, (b) receiving transferrable ink, or (c) containing and receiving transferable ink;

(B) a print fixture plate for supporting a printable product;

(C) a single-angled print pad has:

a contact wall (i) extending from a base wall to a contact wall distal end, and (ii) having a first height, a lower wall (i) extending from the base wall to a lower wall distal end, and (ii) having a second height that is less than the first height, an angled surface contacting the contact wall distal end and the lower wall distal end;

(D) a slidable moving support housing;

(E) a flexion and extension hinge interconnects the single-angled print pad to the slidable moving support housing;

(F) an adjustable and moveable actuator system that (a) controls the movement of the slidable moving support housing and the flexion and extension hinge, and (b) is capable of:

(i) (A) moving or (B) moving and altering the single-angled print pad toward the engraved print plate so (a) the contact wall distal end contacts the engraved print plate prior to the lower wall distal end and (b) the angled surface picks up the transferrable ink, (ii) moving the single-angled print pad (a) away from the engraved print plate and (b) toward the printable product, (iii) altering, between the time frame that the single-angled print pad does (a) not contact the engraved print plate and (b) contacts the printable product, the single-angled print pad's configuration so the angled surface is at least essentially parallel to the print fixture plate;

(iv) moving the single-angled print pad to apply the transferrable ink to the printable product.

2. The printing pad machine of claim 1, wherein the adjustable and moveable actuator system is further capable of:

(v) moving the single-angled print pad away from the printable product and the print fixture plate.

3. The printing pad machine of claim 2, wherein the adjustable and moveable actuator system is further capable of:

(vi) repeating steps i to v.

4. The printing pad machine of claim 1, wherein the printable product is a tubular or cylindrical object.

5. The printing pad machine of claim 4, wherein the tubular or cylindrical object has a curvilinear surface having an outer diameter greater than 2 mm.

6. The printing pad machine of claim 4, wherein the print fixture plate has ball bearings or rollers.

7. The printing pad machine of claim 4, wherein the print fixture plate has multiple sets of ball bearings or rollers.

8. The printing pad machine of claim 4, wherein the image transferred to the tubular or cylindrical object is a 360-degree image on the curvilinear surface.

9. The printing pad machine of claim 4, wherein the print fixture plate has a proximal plate end, and a groove positioned at or near the proximal plate end.

10. The printing pad machine of claim 9, wherein the print fixture plate has (a) a distal plate end, and (b) a plurality of interspaced ribs extending from the groove toward the distal plate end.

11. The printing pad machine of claim 1, wherein the single-angled print pad has at least two additional angled sides interconnected to the angled surface.

12. The printing pad machine of claim 1, wherein the single-angled print pad has ridges on the angled surface.

13. The printing pad machine of claim 1, further comprising a microprocessor; the microprocessor controls the adjustable and moveable actuator system wherein the parameters for the slidable moving support housing's movements and the flexion and extension hinge's movements are inputted into the microprocessor.

14. The printing pad machine of claim 1, wherein the adjustable and moveable actuator system is selected from the group consisting of a pneumatic actuator system, a hydraulic actuator system, an electromechanical actuator system, and combinations thereof.

15. The printing pad machine of claim 1, wherein the print fixture plate has (a) a proximal plate end, (b) a distal plate end, and (c) a plurality of interspaced ribs extending from at or near the proximal plate end toward the distal plate end.

* * * * *